(12) United States Patent
Williamson et al.

(10) Patent No.: US 9,193,894 B2
(45) Date of Patent: Nov. 24, 2015

(54) BINDER COMPOSITIONS AND METHODS FOR MAKING AND USING SAME

(71) Applicant: Georgia-Pacific Chemicals LLC, Atlanta, GA (US)

(72) Inventors: Bobby L. Williamson, Conyers, GA (US); Adam K. Sniady, Lilburn, GA (US); Brian L. Swift, Oxford, GA (US); Ramji Srinivasan, Johns Creek, GA (US); Feng Jing, Snellville, GA (US); Cornel Hagiopol, Lilburn, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 14/205,440

(22) Filed: Mar. 12, 2014

(65) Prior Publication Data

US 2014/0275361 A1      Sep. 18, 2014

Related U.S. Application Data

(60) Provisional application No. 61/782,265, filed on Mar. 14, 2013.

(51) Int. Cl.
  *C09J 167/06* (2006.01)
  *C08F 222/10* (2006.01)

(52) U.S. Cl.
  CPC ....... *C09J 167/06* (2013.01); *C08F 2222/1073* (2013.01)

(58) Field of Classification Search
  CPC .................................................. C09J 167/06
  See application file for complete search history.

(56) References Cited

U.S. PATENT DOCUMENTS 6,291,558 B1 *  9/2001  Raskin et al. ................... 524/13

* cited by examiner

Primary Examiner — Robert Harlan
(74) Attorney, Agent, or Firm — Ram W. Sabnis

(57) ABSTRACT

Binder compositions and methods for making and using same are provided. In at least one specific embodiment, the binder composition can include at least one unsaturated compound having two or more unsaturated carbon-carbon bonds and at least one free radical precursor. At least one of the unsaturated carbon-carbon bonds can be a pi-bond that is not conjugated with an aromatic moiety and can be capable of free radical addition. The free radical precursor can be present in an amount of about 7 wt % to about 99 wt %, based on the weight of the one or more unsaturated compounds.

20 Claims, No Drawings

BINDER COMPOSITIONS AND METHODS FOR MAKING AND USING SAME

CROSS-REFERENCE TO RELATED APPLICATION

This application claims priority to U.S. Provisional Patent Application having Ser. No. 61/782,265, filed Mar. 14, 2013, which is incorporated by reference herein.

BACKGROUND

1. Field

Embodiments described herein generally relate to binder compositions that include one or more unsaturated prepolymers and methods for making and using same. More particularly, embodiments described herein relate to binder compositions that include one or more unsaturated prepolymers for making lignocellulose composite products.

2. Description of the Related Art

The production of lignocellulose composite products requires an adhesive or binder to bond the discrete, particulates, fibers, veneers, or other substrates to one another. Typical lignocellulose composite products include particleboard, fiberboard, plywood, oriented strand board (OSB), and the like. Conventional binders used in the production of these products frequently contain formaldehyde based resins such as urea-formaldehyde (UF), melamine-formaldehyde (MF), melamine-urea-formaldehyde (MUF), and phenol-formaldehyde (PF) binders. While these formaldehyde based resins produce finished products having desirable properties, such as strength, these binders also release formaldehyde into the environment during the production of the binder, curing of the binder in the manufacture of a lignocellulose composite product, as well as, from the final composite product made using the binder.

Various techniques have been used to reduce the amount of formaldehyde released from formaldehyde based resins. For example, the addition of formaldehyde scavengers to the resin and/or various modifications to the particular synthesis steps used to make the formaldehyde based resin, such as the addition of urea as a reactant late in the binder synthesis, are often used in an attempt to reduce formaldehyde emission. These attempts to reduce formaldehyde emission, however, are accompanied with undesirable effects such as longer cure time, reduced resin shelf-life, reduced product strength, reduced tolerance for processing variations, and/or inferior moisture resistance.

There is a need, therefore, for improved binder compositions for making composite lignocellulose containing products having reduced or no formaldehyde emission.

SUMMARY

Binder compositions and methods for making and using same are provided. In at least one specific embodiment, the binder composition can include at least one unsaturated compound having two or more unsaturated carbon-carbon bonds and at least one free radical precursor. At least one of the unsaturated carbon-carbon bonds can be a pi-bond ($\pi$-bond) that is not conjugated with an aromatic moiety and can be capable of free radical addition. The free radical precursor can be present in an amount of about 7 wt % to about 99 wt %, based on the weight of the one or more unsaturated compounds.

In at least one specific embodiment, the method for making a composite product can include combining a plurality of lignocellulose substrates, at least one unsaturated compound, and at least one free radical precursor to produce a mixture. The unsaturated compound can have two or more unsaturated carbon-carbon bonds. At least one of the unsaturated carbon-carbon bonds can be a pi-bond that is not conjugated with an aromatic moiety and can be capable of free radical addition. The method can also include heating the mixture to a temperature of about 60° C. to about 300° C. to produce a composite product.

In at least one specific embodiment, the composite product can include a plurality of lignocellulose substrates and an at least partially cured binder composition. The binder composition, prior to at least partial curing, can include at least one unsaturated compound and at least one free radical precursor. The unsaturated compound can have two or more unsaturated carbon-carbon bonds. At least one of the unsaturated carbon-carbon bonds can be a pi-bond that is not conjugated with an aromatic moiety and can be capable of free radical addition.

DETAILED DESCRIPTION

The one or more unsaturated compounds having two or more unsaturated carbon-carbon bonds and the one or more free-radical precursors can be mixed, blended, stirred, contacted, or otherwise combined with one another to produce the binder composition. The binder composition can be combined with a plurality of lignocellulose substrates to produce a mixture. The mixture can also be referred to as a "furnish," "blended furnish," "resinated mixture," or "resinated furnish." As used herein, the terms "unsaturated compound" and "reactive unsaturated compound" are used interchangeably and refer to compounds having two or more unsaturated carbon-carbon bonds, where at least one of the unsaturated carbon-carbon bonds is capable of free radical addition. As used herein, the phrase "capable of free radical addition," when used in conjunction with "unsaturated compound" means that the carbon-carbon double bond is a pi-bond ($\pi$-bond) that is not conjugated with an aromatic moiety and is capable of going through a free radical chain reaction mechanism. The free radical chain mechanism can include an initiation step, a propagation step, and a termination step. In one or more embodiments, the unsaturated carbon-carbon bond capable of free radical addition can be of an alkene conjugated with a carbonyl group in an $\alpha,\beta$-unsaturated carbonyl compound. The $\alpha,\beta$-unsaturated carbonyl compound can include, but is not limited to, an aldehyde, a ketone, a carboxylic acid, an ester, an amide, an acyl halide, an acid anhydride, or an imide. For example, the $\alpha,\beta$-unsaturated carbonyl compound can be, but is not limited to, an $\alpha,\beta$-unsaturated aldehyde (e.g., an enal), an $\alpha,\beta$-unsaturated ketone (e.g., an enone), an $\alpha,\beta$-unsaturated carboxylic acid, an $\alpha,\beta$-unsaturated ester, an $\alpha,\beta$-unsaturated amide, an $\alpha,\beta$-unsaturated acyl halide, an $\alpha,\beta$-unsaturated acid anhydride, or an $\alpha,\beta$-unsaturated imide. In one or more embodiments, the unsaturated compound can be substantially free or completely free from any aromatic moiety.

The amount of the free radical precursor present in the binder composition can depend, at least in part, on the particular composition of the free radical precursor, the particular composition of the lignocellulose substrates to which the binder composition can be applied, and/or, the particular composition of the unsaturated compound and, thus, can widely vary. For example, a weight ratio of the free radical precursor to the unsaturated compound can be about 0.05:1, about 0.1:1, about 0.2:1, about 0.3:1, about 0.4:1, about 0.5:1, about 0.6:1, about 0.7:1, about 0.8:1, about 0.9:1, or about 1:1 to about 3:1, about 5:1, about 7:1, about 10:1, about 15:1, about 20:1, about 25:1, about 30:1, about 35:1, or about 40:1. In another example, the weight ratio of the free radical precursor to the unsaturated compound can be about 0.25:1 to about 0.65:1, about 0.35:1 to about 0.55:1, about 0.4:1 to about 0.5:1, about 0.4:1 to about 0.45:1, about 0.45:1 to about 0.5:1, about 0.4:1 to about 1:1, about 1:1 to about 5:1, about 2:1 to about 6:1, about 10:1 to about 33:1, about 17:1 to about 37:1, about 4:1 to about 8:1, or about 0.1:1 to about 1:1. In another example, the weight ratio of the free radical precursor to the unsaturated compound can be at least 0.1:1, at least 0.13:1, at least 0.15:1, at least 0.17:1, at least 0.2:1, at least 0.23:1, at least 0.25:1, at least 0.27:1, at least 0.3:1, at least 0.33:1, at least 0.35:1, at least 0.37:1, at least 0.4:1, at least 0.43:1, at least 0.45:1, at least 0.47:1, at least 0.5:1, at least 0.53:1, at least 0.55:1, at least 0.57:1, or at least 0.6:1 to about 1:1, about 2:1, about 3:1, about 4:1, about 5:1, about 10:1, about 20:1, about 30:1, or about 40:1. In yet another example, the weight ratio of the free radical precursor to the unsaturated compound can be about 0.15:1 to about 0.7:1, about 0.2:1 to about 8:1, about 0.3:1 to about 0.6:1, about 0.3:1 to about 4:1, or about 0.4:1 to about 2:1.

The weight ratio of the unsaturated compound to the free radical precursor in the binder composition can be about 0.02:1, about 0.025:1, about 0.05:1, about 0.1:1, about 0.3:1, about 0.5:1, about 0.7:1, or about 1:1 to about 2:1, about 2.5:1, about 3:1, about 3.5:1, about 4:1, about 4.5:1, about 5:1, about 6:1, about 7:1, about 8:1, about 9:1, or about 10:1. In another example, the weight ratio of the unsaturated compound to the free radical precursor can be about 0.025:1 to about 10:1, about 0.1:1 to about 7.5:1, about 0.5:1 to about 5:1, about 0.3:1 to about 2.5:1, about 0.5:1 to about 1.5:1, about 3:1 to about 7:1, about 4:1 to about 6:1, about 6:1 to about 10:1, or about 0.3:1 to about 5.5:1. In another example, the weight ratio of the unsaturated compound to the free radical precursor can be at least 0.02:1, at least 0.025:1, at least 0.3:1, at least 0.35:1, at least 0.4:1, at least 0.45:1, at least 0.5:1, at least 0.6:1, at least 0.65:1, at least 0.7:1, at least 0.75:1, at least 0.8:1, at least 0.85:1, at least 0.9:1, at least 0.95:1, or at least 1:1 to about 3:1, about 4:1, about 5:1, about 6:1, about 7:1, about 8:1, about 9:1, or about 10:1. In yet another example, the weight ratio of the unsaturated compound to the free radical precursor can be about 0.125:1 to about 5:1, about 0.5:1 to about 3:1, about 1.5:1 to about 2.9:1, about 2:1 to about 4:1, or about 2.1:1 to about 4.5:1.

In at least one specific embodiment, the amount of the free radical precursor in the binder composition can be about 1 wt %, about 3 wt %, about 5 wt %, about 7 wt %, about 9 wt %, about 10 wt %, about 12 wt %, about 15 wt %, about 20 wt %, about 25 wt %, about 30 wt %, about 35 wt %, or about 40 wt % to about 60 wt %, about 65 wt %, about 70 wt %, about 75 wt %, about 80 wt %, about 85 wt %, about 90 wt %, about 95 wt %, about 98 wt %, or about 99 wt %, based on the combined weight of the unsaturated compound and the free radical precursor. For example, the amount of the free radical precursor in the binder composition can be about 7 wt % to about 99 wt %, about 7 wt % to about 98 wt %, about 10 wt % to about 80 wt %, about 15 wt % to about 70 wt %, about 17 wt % to about 66 wt %, about 10 wt % to about 45 wt %, about 35 wt % to about 75 wt %, about 15 wt % to about 25 wt %, about 20 wt % to about 35 wt %, about 30 wt % to about 50 wt %, about 35 wt % to about 60 wt %, or about 45 wt % to about 80 wt %, based on the combined weight of the unsaturated compound and the free radical precursor. In another example, the amount of the free radical precursor in the binder composition can be at least 3 wt %, at least 5 wt %, at least 6 wt %, at least 7 wt %, at least 8 wt %, at least 9 wt %, at least 10 wt %, at least 15 wt %, at least 20 wt %, at least 25 wt % at least 20 wt %, at least 35 wt %, at least 40 wt %, or at least 45 wt % to about 50 wt %, about 55 wt %, about 60 wt %, about 65 wt %, about 70 wt %, about 75 wt %, about 80 wt %, about 85 wt %, about 90 wt %, or about 95 wt %, based on the combined weight of the unsaturated compound and the free radical precursor. In another example, the amount of the free radical precursor in the binder composition can be less than 95 wt %, less than 90 wt %, less than 85 wt %, less than 80 wt %, less than 75 wt %, less than 70 wt %, less than 60 wt %, less than 55 wt %, less than 50 wt %, less than 45 wt %, or less 40 wt % and greater than 2 wt %, greater than 5 wt %, greater than 10 wt %, greater than 15 wt %, greater than 20 wt %, or greater than 25 wt %, based on the combined weight of the unsaturated compound and the free radical precursor.

In at least one specific embodiment, the amount of the free radical precursor in the binder composition can be about 1 wt %, about 3 wt %, about 5 wt %, about 7 wt %, about 9 wt %, about 10 wt %, about 12 wt %, about 15 wt %, about 20 wt %, about 25 wt %, about 30 wt %, about 35 wt %, or about 40 wt % to about 60 wt %, about 65 wt %, about 70 wt %, about 75 wt %, about 80 wt %, about 85 wt %, about 90 wt %, about 95 wt %, or about 99 wt %, based on the weight of the unsaturated compound. For example, the amount of the free radical precursor in the binder composition can be about 7 wt % to about 99 wt %, about 10 wt % to about 80 wt %, about 15 wt % to about 70 wt %, about 17 wt % to about 66 wt %, about 10 wt % to about 45 wt %, about 35 wt % to about 75 wt %, about 15 wt % to about 25 wt %, about 20 wt % to about 35 wt %, about 30 wt % to about 50 wt %, about 35 wt % to about 60 wt %, or about 45 wt % to about 80 wt %, based on the weight of the unsaturated compound. In another example, the amount of the free radical precursor in the binder composition can be present in an amount of at least 3 wt %, at least 5 wt %, at least 6 wt %, at least 7 wt %, at least 8 wt %, at least 9 wt %, at least 10 wt %, at least 15 wt %, at least 20 wt %, at least 25 wt % at least 20 wt %, at least 35 wt %, at least 40 wt %, or at least 45 wt % to about 50 wt %, about 55 wt %, about 60 wt %, about 65 wt %, about 70 wt %, about 75 wt %, about 80 wt %, about 85 wt %, about 90 wt %, or about 95 wt %, based on the weight of the unsaturated compound. In another example, the amount of the free radical precursor in the binder composition can be less than 95 wt %, less than 90 wt %, less than 85 wt %, less than 80 wt %, less than 75 wt %, less than 70 wt %, less than 60 wt %, less than 55 wt %, less than 50 wt %, less than 45 wt %, or less than 40 wt % and greater than 2 wt %, greater than 5 wt %, greater than 6 wt %, greater than 7 wt %, greater than 8 wt %, greater than 9 wt %, greater than 10 wt %, greater than 15 wt %, greater than 20 wt %, or greater than 25 wt %, based on the weight of the unsaturated compound.

In at least one specific embodiment, the amount of the unsaturated compound in the binder composition can be about 1 wt %, about 2 wt %, about 2.5 wt %, about 5 wt %, about 10 wt %, about 15 wt %, about 20 wt %, about 25 wt %, about 30 wt %, or about 35 wt % to about 60 wt %, about 65 wt %, about 70 wt %, about 75 wt %, about 80 wt %, about 85 wt %, about 90 wt %, about 93 wt %, or about 95 wt %, based on the combined weight of the unsaturated compound and the free radical precursor. For example, the amount of the unsaturated compound in the binder composition can be about 10 wt % to about 85 wt %, about 30 wt % to about 83 wt %, about 25 wt % to about 65 wt %, about 40 wt % to about 85 wt %, about 35 wt % to about 75 wt %, about 20 wt % to about 40 wt %, about 30 wt % to about 50 wt %, about 40 wt % to about 60 wt %, about 50 wt % to about 70 wt %, or about 70 wt % to about 90 wt %, based on the combined weight of the unsaturated compound and the free radical precursor. In another example, the amount of the unsaturated compound in the binder composition can be at least 3 wt %, at least 5 wt %, at least 10 wt %, at least 15 wt %, at least 20 wt %, at least 25 wt % at least 20 wt %, at least 35 wt %, at least 40 wt %, or at least 45 wt % to about 50 wt %, about 55 wt %, about 60 wt %, about 65 wt %, about 70 wt %, about 75 wt %, about 80 wt %, about 85 wt %, about 90 wt %, or about 95 wt %, based on the combined weight of the unsaturated compound and the free radical precursor. In another example, the amount of the unsaturated compound in the binder composition can be less than 95 wt %, less than 90 wt %, less than 85 wt %, less than 80 wt %, less than 75 wt %, less than 70 wt %, less than 60 wt %, less than 55 wt %, less than 50 wt %, less than 45 wt %, or less 40 wt % and greater than 2 wt %, greater than 5 wt %, greater than 10 wt %, greater than 15 wt %, greater than 20 wt %, or greater than 25 wt %, based on the combined weight of the unsaturated compound and the free radical precursor.

In one or more embodiments, the unsaturated compound can have a double bond equivalent molecular weight of about 33, about 50, about 100, about 150, about 200, about 500, about 1,000, about 5,000, about 10,000, or about 15,000 to about 50,000, about 75,000, about 100,000, about 150,000, about 200,000, or about 250,000. In one or more embodiments, the unsaturated compound can have a double bond equivalent molecular weight of at least 33, at least 40, at least 45, at least 50, at least 75, at least 100, at least 200, at least 300, at least 400, at least 500, at least 1,000, at least 2,500, at least 5,000, at least 10,000, at least 20,000, at least 30,000, at least 40,000, at least 50,000, at least 60,000, at least 70,000, at least 80,000, at least 90,000, at least 100,000, at least 110,000, at least 120,000, at least 130,000, at least 140,000, or at least 150,000 to about 175,000, about 200,000, about 225,000, or about 250,000.

As used herein, the double bond equivalent molecular weight can be calculated by dividing the molecular weight of the unsaturated compound by the number of carbon-carbon double bonds the unsaturated compound contains. For example, if the unsaturated compound is cyclopentadiene, which has a molecular weight of 66.1 g/mol and two carbon-carbon double bonds, the double bond equivalent molecular weight is 33.05 (66.1 divided by 2). Accordingly, as used herein, the term "unsaturated compound" includes compounds that can be considered a monomer or discrete molecules. In another example, if the unsaturated compound is trimethylolpropane triacrylate (TMPTA), which has a molecular weight of 296.32 g/mol and 3 carbon-carbon double bonds, the double bond equivalent molecular weight is 98.8.

In one or more embodiments, the unsaturated compound can have a weight average molecular weight (MW) of about 200, about 250, about 300, about 350, about 400, about 450, about 500, about 550, about 600, or about 650 to about 1,000, about 1,500, about 2,000, about 2,500, about 3,000, about 3,500, about 4,000, about 4,500, about 5,000, about 6,000, about 7,000, about 8,000, about 9,000, or about 10,000. For example, the unsaturated compound can have a weight average molecular weight of about 300 to about 3,000, about 330 to about 770, about 380 to about 930, about 470 to about 1,150, about 700 to about 1,800, about 800 to about 2,200, about 1,200 to about 2,000, about 400 to about 2,800, about 500 to about 2,700, about 600 to about 2,600, or about 700 to about 2,500. In one or more embodiments, the unsaturated compound can have a weight average molecular weight of at least 300, at least 325, at least 350, at least 375, at least 400, at least 425, at least 450, at least 475, at least 500, at least 525, at least 550, at least 575, at least 600, at least 625, at least 650, at least 675, at least 700, at least 750, at least 775, at least 800, at least 825, at least 850, at least 875, at least 900, at least 925, at least 950, at least 975, or at least 1,000.

In one or more embodiments, the unsaturated compound can include, but is not limited to, dicyclopentadiene (DCPD), 4-vinylcyclohexene, one or more vinyl ethers, one or more allyl ethers, diallyl phthalate, allyl crotonate, allyl cinamate, allyl methacrylate, vinyl methacrylate, ethylene glycol diacrylate, ethylene glycol dimethacrylate, diethylene glycol diacrylate, diethylene glycol dimethacrylate, trimethylpropane triacrylate, poly(ethylene glycol)diacrylate, poly(ethylene glycol)dimethacrylate, pentaerythritol tetraacrylate, pentaerythritol triacrylate, polyacrylate, one or more conjugated dienes, one or more terpenes, one or more drying oils having an iodine number of about 115 or greater, one or more unsaturated prepolymers, one or more polyesters with one or more incorporated vinyl unsaturations, styrene-butadiene rubber (SBR), one or more starches having at least one unsaturated and polymerizable olefinic group, polymers derived from ring-opening polymerization of allyl caprolactone, a product or products formed by reacting one or more polyamidoamines and one or more unsaturated glycidyl ethers, or any mixture thereof.

Illustrative vinyl aromatic compounds can include, but are not limited to, 2-allylphenol, 4-allylphenol, and any mixture thereof. Illustrative vinyl ethers can include, but are not limited to, triethyleneglycol divinyl ether, divinyl ether, or any mixture thereof. Illustrative allyl ethers can include, but are not limited to, diallyl ether, trimethylolpropane diallyl ether, triallyl cyanurate, or any mixture thereof. Illustrative conjugated dienes can include, but are not limited to, 1,3-butadiene, 2,3-dimethylbutadiene, 2-methyl-1,3-butadiene (isoprene), 1,3-pentadiene (piperylene), cyclopentadiene, 2-chloro-1,3-butadiene (chloroprene), or any mixture thereof. An illustrative terpene can include, but is not limited to, one or more sesquiterpenes. An illustrative sesquiterpene can include, but is not limited to, one or more farnesenes. Illustrative farnesenes include α-Farnesene (3,7,11-trimethyl-1,3,6,10-dodecatetraene) and β-farnesene (7,11-dimethyl-3-methylene-1,6,10-dodecatriene) and the isomers thereof. Illustrative drying oils having an iodine number of about 115 or greater can include, but are not limited to, linseed oil, soybean oil, sunflower oil, tung oil, grape seed oil, wheat germ oil, corn oil, or any mixture thereof. In some examples, the drying oil can have an iodine number of about 115 to about 180, or greater. Illustrative unsaturated prepolymers can include, but are not limited to, unsaturated polyester prepolymers, unsaturated polyether prepolymers, unsaturated polyamide prepolymers, unsaturated polyurethane prepolymers, or any mixture thereof. Illustrative polyesters with one or more incorporated vinyl unsaturations can include, but are not limited to, methacrylate, acrylate modified or terminated polyesters, or any mixture thereof.

As noted above, the α,β-unsaturated carbonyl compound can be, but is not limited to, an α,β-unsaturated aldehyde (e.g., an enal), an α,β-unsaturated ketone (e.g., an enone), an α,β-unsaturated carboxylic acid, an α,β-unsaturated ester, an α,β-unsaturated amide, an α,β-unsaturated acyl halide, an α,β-unsaturated acid anhydride, or an α,β-unsaturated imide. Illustrative α,β-unsaturated aldehydes can include, but are not limited to, crotonaldehyde, 3-methylcrotonaldehyde, methacrolein, tiglic aldehyde, isomers thereof, or any mixture thereof. Illustrative α,β-unsaturated ketones can include, but are not limited to, methyl vinyl ketone, ethyl vinyl ketone, isomers thereof, or any mixture thereof. Illustrative α,β-unsaturated carboxylic acids can include, but are not limited to, maleic acid, itaconic acid, fumaric acid, glutaconic acid, citraconic acid, traumatic acid, muconic acid, aconitic acid, isomers thereof or any mixture thereof. Illustrative α,β-unsaturated esters can include, but are not limited to, esters of maleic acid, itaconic acid, fumaric acid, glutaconic acid, citraconic acid, traumatic acid, muconic acid, aconitic acid, isomers thereof, or any mixture thereof. An illustrative α,β-unsaturated amide can include, but are not limited to, acrylamide. Illustrative α,β-unsaturated acyl halides can include, but are not limited to, acryloyl chloride, methacryloyl chloride, crotonoyl chloride, fumaryl chloride, itaconyl chloride, sorbic chloride, isomers thereof, or any mixture thereof. An illustrative α,β-unsaturated acid anhydride can include, but is not limited to, maleic anhydride, an isomer thereof, or a mixture thereof. An illustrative α,β-unsaturated imide can include, but is not limited to, maleimide, an isomer thereof, or a mixture thereof.

Other compounds having one or more pi-bonds (e.g., unsaturated bonds) that are capable of going through a radical chain reaction mechanism, but are also conjugated with an aromatic moiety, can include, but are not limited to, vinyl aromatics, such as styrene, methylstyrenes, vinyl toluene, vinyl naphthalene, divinylbenzene (DVB), and vinylpyridine; methylstyrenes, such as α-methylstyrene and trans-β-methylstyrene; and any mixture thereof.

Illustrative unsaturated starch compounds having at least one unsaturated and polymerizable olefinic group can be represented by Formula I below.

Formula I where $R^1$ can be hydrogen or an alkyl group. Suitable starches can include, but are not limited to, maize or corn, waxy maize, high amylose maize, potato, tapioca, and wheat starch. Other starches such as genetically engineered starches can include high amylose potato and potato amylopectin starches. Suitable methods for preparing unsaturated starch compounds having at least one unsaturated and polymerizable olefinic group can include those discussed and described in U.S. Pat. No. 2,668,156.

The unsaturated prepolymer can include one or more monounsaturated prepolymers, one or more polyunsaturated prepolymers, or any mixture thereof. In one or more embodiments, suitable polyunsaturated prepolymers can include at least two sites of unsaturation, at least three sites of unsaturation, at least 4 sites of unsaturation, at least 5 sites of unsaturation, at least 6 sites of unsaturation, or more. In one or more embodiments, the unsaturated prepolymer can be unsaturated polyester prepolymers, unsaturated polyether prepolymers, unsaturated polyamide prepolymers, unsaturated polyurethane prepolymers, or any mixture thereof.

The unsaturated polyester prepolymer can be synthesized or produced by reacting one or more polyacids and one or more polyols with one another. For example, the unsaturated prepolymer can be produced via monoester formation. In another example, the unsaturated polyester prepolymer can be produced by reacting the polyacid and the polyol via a condensation reaction. As used herein, the term "polyacid" refers to compounds having at least two reactive acid groups per molecule. The acid functionality can be a carboxylic acid, a sulfonic acid, or a combination thereof. The term "polyacid" can also refer to acid anhydrides, e.g., maleic anhydride. The term "polyacid" can also refer to compounds containing at least one acid group per molecule and at least one acid anhydride group per molecule, e.g., a maleated fatty acid. As used herein, the term "polyol" refers to compounds that contain two or more hydroxyl functional groups.

In one or more embodiments, the one or more sites of unsaturation in the unsaturated polyester prepolymer can be directly introduced from the polyacid and/or the polyol, e.g., at least one of the polyacid and the polyol can include one or more sites of unsaturation. Said another way, the unsaturated polyester prepolymer can be produced by reacting one or more unsaturated polyacids with one or more saturated polyols, reacting one or more unsaturated polyols with one or more saturated polyacids, and/or by reacting one or more unsaturated polyacids with one or more unsaturated polyols. In one or more embodiments, the sites of unsaturation in the unsaturated polyester prepolymer can be appended to an initial prepolymer formed by reacting the polyacid and the polyol with one or more unsaturated compounds. In another example, the unsaturation sites of the unsaturated polyester prepolymer can be introduced via at least one of the polyol and the poly acid, and an additional unsaturated compound. Illustrative additional unsaturated compounds can include, but are not limited to, unsaturated alcohols, unsaturated acids, unsaturated epoxides, or any mixture thereof.

The polyacid and polyol components can be mixed, blended, or otherwise combined with one another to produce a reaction mixture. The polyacid and polyol can be reacted under conditions sufficient to substantially react the primary hydroxyl groups of the polyol with the polyacid, but insufficient to cause reaction of the secondary hydroxyl groups of the polyol with the polyacid to a substantial extent. As used herein, the phrase "substantially react the primary hydroxyl groups of the polyol with the polyacid" means that at least 90% of the primary hydroxyl groups of the polyol are reacted with the polyacid. As used herein, the phrase "insufficient to cause reaction of the secondary hydroxyl groups of the polyol with the polyacid to a substantial extent" means that less than 10% of the secondary hydroxyl groups of the polyol are reacted with the polyacid. For example, the polyacid and the polyol can be combined in a reaction vessel or container and heated to a temperature of about 50° C., about 60° C., about 70° C., or about 80° C. to about 110° C., about 125° C., about 140° C., or about 155° C. In another example, the polyacid and the polyol can be heated to a temperature of about 60° C. to about 130° C., about 80° C. to about 115° C., about 100° C. to about 150° C., or about 75° C. to about 135° C. The polyacid and the polyol can be reacted with one another for a time of about 10 minutes, about 30 minutes, about 1 hour, or about 2 hours to about 4 hours, about 6 hours, about 8 hours, or about 10 hours.

The progress of the reaction between the polyacid and the polyol can be monitored via any suitable method. One method for monitoring the extent of the reaction between the polyacid and the polyol can be through the use of infrared spectroscopy. For example, infrared spectroscopy can detect the presence of any unreacted polyacid. In one example, the reaction between the polyacid and the polyol can be carried out until the presence of the polyacid is no longer detected. It should be noted, however, that the unsaturated polyester prepolymer can include unreacted polyacid and/or unreacted polyol.

The polyacid and the polyol can be combined with one another in any desired ratio. For example, the polyol and the polyacid can be combined with one another at a molar ratio raging of about 1:5, about 1:4, or about 1:2, to about 1:1, about 2:1, about 4:1, or about 6:1. In at least one example, the amount of the polyacid combined with the polyol can be sufficient to provide a ratio of reactive acid and/or anhydride group(s) to hydroxy groups of about 1:1 to about 2:1. In one or more embodiments, for each hydroxy group present in the polyol about 1 acid group, about 2 acid groups, or about 3 acid groups can be present in the mixture of the polyol and the polyacid.

The polyacid can be or include, but is not limited to, one or more unsaturated and/or saturated aliphatic polyacids, one or more aromatic polyacids, one or more cyclo-aliphatic polyacids, one or more acid anhydrides, or any mixture thereof. Suitable unsaturated aliphatic diacids and saturated aliphatic diacids can include about 2 carbon atoms to about 12 carbon atoms, about 3 carbon atoms to about 10 carbon atoms, or about 4 carbon atoms to about 8 carbon atoms. Illustrative unsaturated aliphatic diacids can include, but are not limited to, maleic acid, itaconic acid, fumaric acid, glutaconic acid, citraconic acid, traumatic acid, muconic acid, aconitic acid, or any mixture thereof. Illustrative saturated aliphatic diacids can include, but are not limited to, oxalic acid, malonic acid, succinic acid, glutaric acid, adipic acid, pimelic acid, suberic acid, azelaic acid, sebacic acid, or any mixture thereof. Illustrative aromatic diacids can include, but are not limited to, phthalic acid, isophthalic acid, terephthalic acid, or any mixture thereof. Illustrative cyclo-aliphatic diacids can include, but are not limited to, cyclobutanedicarboxylic acid, cyclopentanedicarboxylic acid, cyclohexanedicarboxylic acid, isomers thereof, or any mixture thereof. Illustrative acid anhydrides can include, but are not limited to, phthalic anhydride, mellitic anhydride, pyromellitic anhydride, maleic anhydride, or any mixture thereof. In one or more embodiments, the polyacid can also include one or more unsaturated fatty acids reacted with any one or more of the polyacids discussed and described above. For example, in at least one specific embodiment, the polyacid can be or include the Alder-Ene reaction product between one or more unsaturated fatty acids and maleic anhydride. Said another way, the polyacid can be or include one or more maleated fatty acids.

Illustrative saturated polyols can include, but are not limited to, ethylene glycol, polyglycerol, hyperbranched polyglycerol, diethylene glycol, triethylene glycol, polyethylene oxide (hydroxy terminated), glycerol, pentaerythritol, trimethylolpropane, diethanolamine, triethanolamine, ethyl diethanolamine, methyl diethanolamine, sorbitol, monosaccharides, such as glucose and fructose, disaccharides, such as sucrose, and higher polysaccharides such as starch and reduced and/or modified starches, dextrin, maltodextrin, polyvinyl alcohols, hydroxyethylcellulose, 1,4-cyclohexane diol, or any mixture thereof. Illustrative unsaturated polyols can include, but are not limited to, 2-butene-1,4-diol, hydroxyl-terminated polybutadiene (HTPB), or any mixture thereof.

Illustrative unsaturated alcohols suitable for introducing, appending, or otherwise providing one or more sites of unsaturation in the unsaturated polyester prepolymer can include, but are not limited to, any one or more of the unsaturated polyols discussed and described above, allylic alcohols, unsaturated alcohols obtained via metathesis reaction of hydroxyl-substituted unsaturated fatty acid or fatty acid esters, or any mixture thereof. The preparation of unsaturated alcohols via metathesis reaction can be as discussed and described in U.S. Pat. No. 7,176,336. Illustrative unsaturated acids suitable for introducing, appending, or otherwise providing one or more sites of unsaturation in the unsaturated polyester prepolymer can include, but are not limited to, any one or more of the unsaturated polyacids discussed and described above, or any mixture thereof. Suitable unsaturated epoxides suitable for introducing, appending, or otherwise providing one or more sites of unsaturation in the unsaturated polyester prepolymer can include, but are not limited to, allyl glycidyl ether, 3,4-epoxy-1-butene, 1,2-epoxy-5-hexene, any combination thereof or mixture thereof.

In one or more embodiments, one or more catalysts or unsaturated polyester prepolymer catalysts can optionally be present when the polyacid and the polyol are reacted with one another. Suitable catalysts can include, but are not limited to, monobutyltin oxide, dibutyltin oxide, dibutyltin dilaurate, or any mixture thereof. The one or more catalysts, if present, can be present in an amount of about 0.05 wt %, about 0.1 wt %, about 0.5 wt %, or about 1 wt % to about 2 wt %, about 3 wt %, about 4 wt %, or about 5 wt %, based on the combined weight of the polyacid and the polyol.

In one or more embodiments, the unsaturated polyester prepolymer can be combined with one or more reactive monomers in lieu of or in addition to the water. Illustrative reactive monomers that can be combined with the unsaturated polyester prepolymer can include, but are not limited to, styrene, methyl styrene, chlorostyrene, vinyl toluene, divinyl benzene, vinyl acetate, acrylic acid, methacrylic acid, lower alkyl esters of acrylic acid, lower alkyl esters of methacrylic acid, diallyl phthalate, vegetable oils, e.g., linseed oil, soy bean oil, sunflower oil, tung oil, or any mixture thereof. If the unsaturated polyester prepolymer is combined with one or more reactive monomers, the amount of the one or more reactive monomers can be about 1 wt %, about 5 wt %, about 10 wt %, about 15 wt %, or about 20 wt % to about 40 wt %, about 45 wt %, about 50 wt %, about 55 wt %, or about 60 wt %, based on the combined weight of the one or more reactive monomers and the unsaturated polyester prepolymer.

The unsaturated polyamide prepolymers can be produced by reacting one or more polyamines with one or more polyacids. The unsaturated polyamide prepolymers can also be produced by reacting one or more polyamines with one or more esters. In one or more embodiments, the one or more sites of unsaturation in the unsaturated polyamide prepolymer can be directly introduced from the polyacid and/or the polyamine, e.g., at least one of the polyacid and the polyamine can include one or more sites of unsaturation. Said another way, the unsaturated polyamide prepolymer can be produced by reacting one or more unsaturated polyacids with one or more saturated polyamines, reacting one or more unsaturated polyamines with one or more saturated polyacids, and/or by reacting one or more unsaturated polyacids with one or more unsaturated polyamines. In one or more embodiments, the sites of unsaturation in the unsaturated polyamide prepolymer can be appended to an initial prepolymer formed by reacting the polyacid and the polyamine with one or more unsaturated compounds. In another example, the unsaturation sites of the unsaturated polyamide prepolymer can be introduced via at least one of the polyamine and the poly acid, and an additional unsaturated compound. Illustrative additional unsaturated compounds can include, but are not limited to, unsaturated alcohols, unsaturated acids, unsaturated epoxides, or any mixture thereof.

The polyacid and polyamine components can be mixed, blended, or otherwise combined with one another to produce a reaction mixture. The reaction mixture can be reacted under conditions sufficient to react the polyacid with the polyamine to produce the unsaturated polyamide prepolymer. For example, the polyacid and the polyamine can be combined in a reaction vessel or container and heated to a temperature of about 50° C., about 60° C., about 70° C., or about 80° C. to about 110° C., about 125° C., about 140° C., or about 155° C. In another example, the polyacid and the polyamine can be heated to a temperature of about 60° C. to about 130° C., about 80° C. to about 115° C., about 100° C. to about 150° C., or about 75° C. to about 135° C. The polyacid and the polyamine can be reacted with one another for a time of about 10 minutes, about 30 minutes, about 1 hour, or about 2 hours to about 4 hours, about 6 hours, about 8 hours, or about 10 hours. Polyamides can also be produced or obtained via transamidation.

The progress of the reaction between the polyacid and the polyamine can be monitored via any suitable method. One method for monitoring the extent of the reaction between the polyacid and the polyamine can be through the use of infrared spectroscopy. For example, infrared spectroscopy can detect the presence of any unreacted polyacid. In one example, the reaction between the polyacid and the polyamine can be carried out until the presence of the polyacid is no longer detected. It should be noted, however, that the unsaturated polyamide prepolymer can include unreacted polyacid and/or unreacted polyamine.

The polyacid and the polyamine can be combined with one another in any desired ratio. For example, the polyamine and the polyacid can be combined with one another at a molar ratio of about 1:5, about 1:4, or about 1:2, to about 1:1, about 2:1, about 4:1, or about 6:1. In at least one example, the amount of the polyacid combined with the polyamine can be sufficient to provide a ratio of reactive acid and/or anhydride group(s) to amine groups of about 1:1 to about 2:1. For example, for each amine group present in the polyamine about 1 acid group, about 2 acid groups, or about 3 acid groups can be present in the mixture of the polyamine and the polyacid.

Suitable polyacids can include those discussed and described above or elsewhere herein. Illustrative saturated polyamines can include, but are not limited to, ethylenediamine, propylenediamine, hexamethylenediamine, diethylenetriamine (DETA), triethylenetetramine (TETA), tetraethylenepentamine (TEPA), 1,3-propanediamine, 1,4-butanediamine, hyperbranched polyethyleneimine, or any mixture thereof. Illustrative unsaturated polyamines can include those represented by the following general Formula II below:

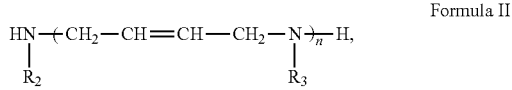

Formula II where $R^2$ and $R^3$ can independently be an organic group having 1 carbon atom to about 24 carbon atoms, e.g., an alkyl group containing 1 carbon atom to about 12 carbon atoms, and n can be an integer of 2 to about 12. Illustrative unsaturated polyamines having Formula II can be prepared according to the methods discussed and described in U.S. Pat. No. 3,773,833.

The unsaturated polyether prepolymers can be produced by polymerization of allyl glycidyl ether (AGE) to form poly (allyl glycidyl ether) (PAGE). The prepolymer can include pendant allyl groups. Suitable reaction conditions for producing the unsaturated polyether prepolymer can include those discussed and described in Lee, B. F. et al., "Poly(Allyl Glycidyl Ether)—A Versatile and Functional Polyether Platform," Journal of Polymer Science Part A: Polymer Chemistry, Vol. 49, August 2011, pp. 4498-4504. The copolymerization reaction of AGE with other monomers can be as discussed and described in Sunder, A. et al., "Copolymers of Glycidol and Glycidyl Ethers: Design of Branched Polyether Polyols by Combination of Latent Cyclic AB₂ and ABR Monomers," Macromolecules, Vol. 33, September 2000, pp. 7682-7692, and Erberich, M. et al., "Polyglycidols with Two Orthogonal Protective Groups: Preparation, Selective Deprotection, and Functionalization," Macromolecules, Vol. 40, April 2007, pp. 3070-3079.

The unsaturated polyurethane prepolymers can be produced by reacting one or more polyisocyanates with one or more compounds containing active hydrogen functionality. Moieties that provide active hydrogen functionality can include, but are not limited to, hydroxyl groups, mercaptan groups, amine groups, and carboxyl groups. For example, one or more polyols can be reacted with the polyisocyanate to produce the unsaturated polyurethane prepolymer.

Suitable polyisocyanates can include, but are not limited to, hexamethylene diisocyanate, toluene diisocyanate (TDI), diphenylmethane diisocyanate (MDI), m-phenylene and p-phenylene diisocyanates, bitolylene diisocyanate, cyclohexane diisocyanate (CHDI), bis-(isocyanatomethyl)cyclohexane ($H_6XDI$), dicyclohexylmethane diisocyanate ($H_{12}MDI$), dimer acid diisocyanate (DDI), trimethyl hexamethylene diisocyanate, lysine diisocyanate and its methyl ester, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like, and mixtures thereof. Triisocyanates and high-functional isocyanates can also be used. Aromatic and aliphatic diisocyanates, for example, biuret and isocyanurate derivatives can be used.

Suitable polyols for reacting with the polyisocyanates can include, but are not limited to, polyether polyols (e.g., block polyethylene and polypropylene oxide homo- and co-polymers in molecular weight of about 300 to about 3,000), alkylated polyols (e.g., polytetramethylene ether glycols), caprolactone-based polyols, and the like. In one or more embodiments, the reactants for making the polyurethane prepolymer can be or include mixtures of aliphatic and aromatic polyols, or a multi-functional, active hydrogen-bearing polymer. As such, in addition to or in lieu of polyether polyols, the hydroxyl-functional component can include derivatives of acrylates, esters, vinyls, and castor oils, as well as polymers and mixtures thereof.

Isocyanate equivalents can predominate over active hydrogen equivalents in the polyisocyanate/polyol reaction mixture to produce a prepolymer that can include residual isocyanate groups. The isocyanate and the polyol can be combined with one another in any desired ratio. For example, the isocyanate and the polyol can be combined with one another at a molar ratio of about 1:5, about 1:4, or about 1:2, to about 1:1, about 2:1, about 4:1, or about 5:1. Suitable reaction conditions for producing the unsaturated polyurethane prepolymer can include those discussed and described in Heiss, et al., "Influence of Acids and Bases on Preparation of Urethane Polymers," Industrial and Engineering Chemistry, Vol. 51, No. 8, August 1959, pp. 929-934. Depending upon the reaction conditions used (such as, for example, temperature and the presence of strong acids or bases, and catalysts), the reaction may lead to the formation of ureas, allophanates, biurets, or isocyanates.

Suitable amine group containing compounds that can be reacted with the polyisocyanates can include, but are not limited to, unsaturated polyamines represented by the general Formula II discussed and described above. Suitable carboxyl group containing compounds that can be reacted with the polyisocyanates can include, but are not limited to, unsaturated aliphatic diacids. Illustrative unsaturated aliphatic diacids can include, but are not limited to, maleic acid, itaconic acid, fumaric acid, glutaconic acid, citraconic acid, traumatic acid, muconic acid, aconitic acid, or any mixture thereof.

In one or more embodiments, one or more catalysts or unsaturated polyurethane prepolymer catalysts can be used to accelerate the rate of reaction of the polyisocyanate and the polyol to produce the unsaturated polyurethane prepolymer. Suitable catalysts can include, but are not limited to, dibutyl tin dilaurate. In one or more embodiments, one or more inhibitors can be used to slow the cross-linking reaction. Suitable inhibitors can include, but are not limited to, benzoyl chloride and monophenyldichlorophosphate.

In one or more embodiments, the unsaturated prepolymer, can have a pH of about 0.5, about 2, about 3, or about 4 to about 7, about 7.5, about 8, about 8.5, or about 9. For example, the unsaturated polyester prepolymer can have a pH of about 1.5 to about 9, about 2.5 to about 7, about 1 to about 5, about 5 to about 8, or about 3 to about 6.

In one or more embodiments, the unsaturated prepolymer can be combined with water to produce a water and unsaturated prepolymer mixture. For example, water can be mixed, blended, or otherwise combined with the unsaturated prepolymer to produce the water and unsaturated prepolymer mixture. The unsaturated prepolymer can be soluble in water. The unsaturated prepolymer can be dissolved in water to produce an aqueous unsaturated prepolymer solution. The unsaturated prepolymer can be combined with water to form an aqueous suspension, emulsion, or dispersion. The amount of the water, combined with the unsaturated prepolymer can be about 1 wt %, about 5 wt %, about 10 wt %, about 15 wt %, about 20 wt %, about 25 wt %, about 30 wt %, or about 35 wt % to about 50 wt %, about 55 wt %, about 60 wt %, about 65 wt %, about 70 wt %, or about 75 wt %, based on the combined weight of the water and the unsaturated prepolymer. The unsaturated polyester prepolymer combined with water can have a viscosity of about 20 cP, about 100 cP, 1,000 cP, about 5,000 cP, or about 10,000 cP to about 50,000 cP, about 100,000 cP, about 200,000 cP, or about 300,000 cP at a temperature of about 25° C. The viscosity of the unsaturated polyester prepolymer can be determined using a viscometer at a temperature of about 25° C. For example, a suitable viscometer can be the model DV-II+ viscometer, available from Brookfield Engineering Laboratories, with a small sample adapter, for example, a number 3 spindle. The small sample adapter can allow the sample to be cooled or heated by the chamber jacket to maintain the temperature of the sample surrounding the spindle at a temperature of about 25° C.

Polyamidoamines and unsaturated glycidyl ethers suitable for producing one or more products formed by reacting the polyamidoamine and the unsaturated glycidyl ether can widely vary. The polyamidoamine can be a reaction product of a polyamine and a dicarboxylic acid. In some example, the polyamine can be dimethylenetriamine, diethylenetriamine, triethylenetetramine, tripropylenetetramine, tetraethylenepentamine, pentaethylenehexamine, or any mixture thereof. The dicarboxylic acid can be glutaric acid, adipic acid, azelaic acid, malonic acid, suberic acid, sebacic acid, succinic acid, oxalic acid, pimelic acid, derivatives thereof, or any mixture thereof. The epihalohydrin can be epichlorohydrin, epibromohydrin, epifluorohydrin, epiiodohydrin, or any mixture thereof.

Illustrative unsaturated glycidyl ethers can be represented by general Formula III:

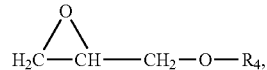

Formula III where $R^4$ can be an ethylenically unsaturated radical such as vinyl, allyl, alkenyl, and the like. Suitable glycidyl ethers can include, but are not limited to, vinyl glycidyl ether, isopropenyl glycidyl ether, oleyl glycidyl ether, allyl glycidyl ether, p-vinylbenzyl glycidyl ether, o-allyl phenyl glycidyl ether, butenyl glycidyl ether, 4-vinylcyclohexyl glycidyl ether, abietylglycidyl ether, cyclohexeneylmethyl glycidyl ether, methallyl glycidyl ether, or any mixture thereof.

Suitable reaction products produced by reacting one or more polyamidoamines and one or more unsaturated glycidyl ethers and methods for making the reaction products can be as discussed and described in U.S. Pat. Nos. 2,864,775 and 3,280,054.

The product(s) formed by reacting the polyamidoamine(s) and the unsaturated glycidyl ether(s) can act or serve as active reducers. As used herein, the term "active reducer" refers to compounds that can participate in a cross-linking reaction, e.g., have double bonds, and also have one or more groups that can be oxidized, e.g., a tertiary amine.

Any suitable free radical precursor or combination of free radical precursors can be used to produce the binder composition. The free radical precursor can be a solid, liquid, gas, or multi-phase. As used herein, the phrase "free radical precursor" refers to any compound or mixture of compounds that can generate radicals when subjected to predetermined conditions. For example, the free radical precursor can be a compound or mixture of compounds that can generate radicals when heated to a predetermined temperature. For example, if the free radical precursor includes an oxidant, e.g., an inorganic oxidant such as hydrogen peroxide, and a catalyst or free radical precursor catalyst, e.g., a transition metal catalyst, the free radical precursor can generate radicals when the oxidant is subjected to reaction with the catalyst. As such, in one or more embodiments, the free radical precursor can include one or more oxidants and one or more catalysts.

Illustrative free radical precursors can include, but are not limited to, inorganic and/or organic peroxy compounds, ozonides, halogen containing oxidants, or any mixture thereof. Illustrative inorganic peroxy compounds can include, but are not limited to, hydrogen peroxide, hydrogen peroxide generating compounds, e.g., alkali metal salts of percarbonate, perborate, peroxysulfate, peroxyphosphate, and/or peroxysilicate, and/or corresponding weak acids. Illustrative organic peroxy compounds can include, but are not limited, to t-butyl peroxide, benzoyl peroxide, peroxy carboxylic acids, e.g., peracetic acid and/or perbenzoic acid, hydroperoxides, e.g., t-butyl hydroperoxide, or mixture thereof. Illustrative halogen containing oxidants can include, but are not limited to, alkali metal chlorite, alkali metal hypochlorite, chlorine dioxide, and/or a chloro sodium salt of cyanuric acid. An illustrative ozonide can include, but is not limited to, dimethyloxirane. An illustrative azo compound can include, but is not limited to, azobisisobutyronitrile (AIBN). In one or more embodiments, the free radical precursor can be or include one or more inorganic oxidants. In one or more embodiments, the free radical precursor can be or include one or more inorganic peroxy compounds. In one or more embodiments, the free radical precursor can be or include hydrogen peroxide.

If the one or more oxidants are present as the free radical precursor or as a component of the free radical precursor, the one or more oxidants can be present in an amount of about 1 wt %, about 3 wt %, about 5 wt %, about 7 wt %, about 9 wt %, about 10 wt %, about 12 wt %, about 15 wt %, about 20 wt %, about 25 wt %, about 30 wt %, about 35 wt %, or about 40 wt % to about 60 wt %, about 65 wt %, about 70 wt %, about 75 wt %, about 80 wt %, about 85 wt %, about 90 wt %, about 95 wt %, or about 99 wt %, based on the weight of the unsaturated compound. For example, the amount of the free radical precursor in the binder composition can be about 7 wt % to about 99 wt %, about 10 wt % to about 80 wt %, about 15 wt % to about 70 wt %, about 17 wt % to about 66 wt %, about 10 wt % to about 45 wt %, about 35 wt % to about 75 wt %, about 15 wt % to about 25 wt %, about 20 wt % to about 35 wt %, about 30 wt % to about 50 wt %, about 35 wt % to about 60 wt %, or about 45 wt % to about 80 wt %, based on the weight of the unsaturated compound. In another example, the amount of the free radical precursor in the binder composition can be present in an amount of at least 3 wt %, at least 5 wt %, at least 6 wt %, at least 7 wt %, at least 8 wt %, at least 9 wt %, at least 10 wt %, at least 15 wt %, at least 20 wt %, at least 25 wt % at least 20 wt %, at least 35 wt %, at least 40 wt %, or at least 45 wt % to about 50 wt %, about 55 wt %, about 60 wt %, about 65 wt %, about 70 wt %, about 75 wt %, about 80 wt %, about 85 wt %, about 90 wt %, or about 95 wt %, based on the weight of the unsaturated compound. In another example, the amount of the free radical precursor in the binder composition can be less than 95 wt %, less than 90 wt %, less than 85 wt %, less than 80 wt %, less than 75 wt %, less than 70 wt %, less than 60 wt %, less than 55 wt %, less than 50 wt %, less than 45 wt %, or less 40 wt % and greater than 2 wt %, greater than 5 wt %, greater than 6 wt %, greater than 7 wt %, greater than 8 wt %, greater than 9 wt %, greater than 10 wt %, greater than 15 wt %, greater than 20 wt %, or greater than 25 wt %, based on the weight of the unsaturated compound.

The free radical precursor can be combined with one or more liquid mediums. For example, the free radical precursor can be or include an aqueous solution of hydrogen peroxide. The concentration of free radical precursor, e.g., hydrogen peroxide combined with a liquid medium such as water, can be about 1 wt %, about 3 wt %, about 5 wt %, about 10 wt %, about 15 wt %, about 20 wt %, about 25 wt %, or about 30 wt % to about 50 wt %, about 60 wt %, about 70 wt %, about 80 wt %, about 90 wt %, or about 98 wt %, based on the combined weight of the free radical precursor and the liquid medium.

If the catalyst or free radical precursor catalyst is present in the binder composition as a component of the free radical precursor, the catalyst can be combined with the other component(s) of the free radical precursor, e.g., an oxidant, to any other component of the binder composition, or any combination thereof to produce the binder composition. The catalyst can also be referred to as an initiator, a promoter, a reducer, and/or an accelerator. Suitable catalysts can be or include, but are not limited to, metal ions, tertiary amines, polymeric tertiary amines, phosphates, bisulfites, metabisulfites, tetraacetylethylenediamine, cyanamides, ultraviolet light, or any mixture thereof. In one or more embodiments, in addition to or in lieu of contacting the lignocellulose substrates with a free radical precursor and/or catalyst, ultrasonic waves, photo-Fenton and/or electro-Fenton reactions (in situ generation of hydroxyl radicals by radiation or electric currents) can be used. In one or more embodiments, the catalyst can be or include one or more transition metals with coordinated Lewis bases.

Illustrative metal ions can include, but are not limited to, metal ions of iron, copper, manganese, tungsten, molybdenum, or any mixture thereof. The metal can be in the form of an oxide. The metal can be in the form of a salt or complex, e.g., bound to one or more complexing agents or compounds. Illustrative ions or complexing compounds can include, but are not limited to, cyanide ($CN^-$), sulfate ($SO_4^{2-}$), ethylenediaminetetraacetic acid (EDTA), ethylenediamine-N,N'-disuccinic acid (EDDS), ethyleneglycol bis(2-aminoethylether)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotriacetic acid (NTA), or any mixture thereof. Other complexing compounds can include phosphates, or complexing agents based on phosphonic acid, oxalic acid, ascorbic acid, nitrilo acetate, gallic acid, fulvic acid, or polyoxomethalates.

The metal ions can include compounds or complexes containing iron ions (e.g., $Fe^{2+}$ or $Fe^{3+}$) such as iron(II) sulfate, iron(II) oxide, iron(III) sulfate, iron(III) oxide. Other iron ion containing catalyst can include, but are not limited to, ferricyanide ($[Fe(CN)_6]^{3-}$), ferrocyanide ($[Fe(CN)_6]^{4-}$), and/or nitroprusside ($[Fe(CN)_5NO]^{2-}$). For example, the catalyst can be or include, but is not limited to, potassium ferricyanide ($K_3[Fe(CN)_6]$), potassium ferrocyanide ($K_4[Fe(CN)_6]$), ammonium ferricyanide hydrate (($NH_4)_3[Fe(CN)_6].xH_2O$), ammonium ferrocyanide hydrate (($NH_4)_4[Fe(CN)_6].xH_2O$), sodium ferricyanide decahydrate ($Na_3[Fe(CN)_6].10H_2O$), sodium ferrocyanide decahydrate ($Na_4[Fe(CN)_6].10H_2O$), sodium nitroprusside dihydrate ($Na_2[Fe(CN)_5NO].2H_2O$). Other suitable catalyst that contain iron can include, but are not limited to, Fe[EDTA], Fe[EDDS], Fe[DTPA], Fe[EGTA], Fe[CDTA], Fe[IDS], or any mixture thereof. In at least one specific embodiment, the catalyst can include ferricyanide, e.g., potassium ferricyanide, a complex of iron (e.g., ferric and/or ferrous) and ethylenediaminetetraacetic acid (EDTA), a complex of iron (e.g., ferric and/or ferrous) and (S,S)-ethylenediamine-N,N'-disuccinic acid ((S,S)-EDDS), a complex of iron (e.g., ferric and/or ferrous) and (R,R)-ethylenediamine-N,N'-disuccinic acid ((R,R)-EDDS), a complex of iron (e.g., ferric and/or ferrous) and (R,S)-ethylenediamine-N,N'-disuccinic acid ((R,S)-EDDS), a complex of iron (e.g., ferric and/or ferrous) and diethylenetriaminepentaacetic acid (DTPA), a complex of iron (e.g., ferric and/or ferrous) and trans-1,2-diaminocyclohexane tetraacetic acid (CDTA), a complex of iron (e.g., ferric and/or ferrous) and iminodisuccinate (IDS), hydrates thereof, or any mixture thereof.

Tertiary amines can be represented by the general formula $NR^5R^6R^7$, where each $R^5$, $R^6$, and $R^7$ can independently be selected from alkyls, cycloalkyls, heterocycloalkyls, aryls, heteroaryls, and substituted aryls. The alkyl can include branched or unbranched alkyls having 1 carbon atom to about 15 carbon atoms or 1 carbon atom to about 8 carbon atoms. Illustrative alkyls can include one or more, but are not limited to, methyl, ethyl, n-propyl, isopropyl, n-butyl, sec-butyl, t-butyl, pentyl, hexyl, ethylhexyl, and isomers thereof. The cycloalkyls can include 3 carbon atoms to about 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups can include one aromatic ring or two or three fused or linked aromatic rings, e.g., phenyl, naphthyl, biphenyl, anthracenyl, phenanthrenyl, and the like. The aryl substituents can include 1 carbon atom to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that is/are a functional group(s) such as hydroxyl, alkoxy, alkylthio, phosphino, amino, halo, and silyl. Illustrative tertiary amines can include, but are not limited to, trimethylamine, triethylamine, triethanolamine, or any mixture thereof. Illustrative polymeric tertiary amines can include, but are not limited to, poly(N-methyldiallyl amine), poly(N-dimethylvinyl amine), copolymers of N-dimethylvinyl amine, or any mixture thereof.

Illustrative phosphates can be or include, but are not limited to, potassium phosphate, sodium phosphate, ammonium phosphate, or any mixture thereof. Illustrative bisulfites can include sodium bisulfite. Illustrative metabisulfites can be or include, but are not limited to, sodium metabisulfite, potassium metabisulfite, or a combination or mixture thereof. Illustrative cyanamides can include, but are not limited to, cyanamide, calcium cyanamide, sodium hydrogen cyanamide, or any mixture thereof.

The catalyst, if combined with a liquid medium, can have a total concentration of solids of about 0.001 wt % to about 99.9 wt %. For example, if the catalyst is combined with a liquid medium, the mixture of the catalyst and liquid medium can have a concentration of solids of about 0.1 wt %, about 0.5 wt %, about 1 wt %, or about 2 wt % to about 4 wt %, about 5 wt %, about 6 wt %, about 7 wt %, or about 8 wt %, based on the combined weight of the catalyst and the liquid medium.

The amount of catalyst present in the binder composition can widely vary. For example, the amount of catalyst in the binder composition can be about 0.01 wt %, about 0.1 wt %, about 0.5 wt %, about 1 wt %, or about 3 wt % to about 8 wt %, about 10 wt %, about 12 wt %, about 14 wt %, about 17 wt %, or about 20 wt %, based on the combined weight of the unsaturated compound and the free radical precursor, where the catalyst is a component or part of the free radical precursor. In another example, the amount of catalyst in the binder composition can be about 1 wt % to about 5 wt %, about 3 wt % to about 13 wt %, about 0.1 wt % to about 9 wt %, about 1 wt % to about 7 wt %, about 7 wt % to about 15 wt %, or about 0.2 wt % to about 15 wt %, based on the combined weight of the unsaturated compound and the free radical precursor, where the catalyst is a component or part of the free radical precursor. In another example, when the free radical precursor includes both the catalyst and an oxidant, e.g., an inorganic oxidant, the amount of catalyst in the binder composition can be about 0.0001 wt %, about 0.001 wt %, about 0.01 wt %, about 0.1 wt %, about 0.13 wt %, or about 0.15 wt % to about 0.17 wt %, about 0.2 wt %, about 0.23 wt %, about 0.25 wt %, about 0.27 wt %, about 0.3 wt %, about 0.35 wt %, about 0.4 wt %, about 0.5 wt %, about 1 wt %, about 2 wt %, about 3 wt %, about 4 wt %, about 5 wt %, about 6 wt %, about 7 wt %, about 8 wt %, about 9 wt %, or about 10 wt %, based on the combined weight of the unsaturated compound, the free radical precursor, and the oxidant. In another example, the amount of catalyst in the binder composition can be about 0.01 wt % to about 2 wt %, about 0.17 wt % to about 0.37 wt %, about 0.19 wt % to about 0.31 wt %, about 0.2 wt % to about 0.29 wt %, about 0.05 wt % to about 1.5 wt %, or about 0.2 wt % to about 2 wt %, about 0.5 wt % to about 3.5 wt %, about 1.3 wt % to about 2 wt %, about 0.8 wt % to about 2.4 wt %, or about 1.4 wt % to about 1.7 wt %, based on the combined weight of the unsaturated compound, free radical precursor, and oxidant.

The binder composition can have a viscosity of about 1 cP, about 20 cP, about 100 cP, 1,000 cP, about 5,000 cP, or about 10,000 cP to about 50,000 cP, about 100,000 cP, about 200,000 cP, or about 300,000 cP at a temperature of 25° C. For example, the binder composition can have a viscosity of about 20 cP to about 50,000 cP, about 500 cP to about 25,000 cP, about 15,000 cP to about 45,000 cP, or about 3,000 cP to about 40,000 cP at a temperature of about 25° C. The viscosity of the binder composition and/or any other composition discussed and described herein can be determined using a viscometer at a temperature of about 25° C. For example, a suitable viscometer can be the model DV-II+ viscometer, available from Brookfield Engineering Laboratories, with a small sample adapter, for example, a number 3 spindle. The small sample adapter can allow the sample to be cooled or heated by the chamber jacket to maintain the temperature of the sample surrounding the spindle at a temperature of about 25° C.

The pH of the binder composition can be acidic, neutral, or basic. For example, the pH of the binder composition can be about 0.5, about 2, about 3, or about 4 to about 7, about 7.5, about 8, about 8.5, or about 9. For example, the binder composition can have a pH of about 1.5 to about 9, about 2.5 to about 7, about 1 to about 5, about 5 to about 8, or about 3 to about 6. The pH of the binder composition can be adjusted to any desired pH by combining one or more base compounds, one or more acid compounds, or a combination of one or more base compounds and one or more acid compounds therewith.

Illustrative base compounds that can be used to adjust the pH of the binder composition can include, but are not limited to, hydroxides, carbonates, ammonia, amines, or any mixture thereof. Illustrative hydroxides can include, but are not limited to, sodium hydroxide, potassium hydroxide, ammonium hydroxide (e.g., aqueous ammonia), lithium hydroxide, cesium hydroxide, or any mixture thereof. Illustrative carbonates can include, but are not limited to, sodium carbonate, sodium bicarbonate, potassium carbonate, ammonium carbonate, or any mixture thereof. Illustrative amines can include, but are not limited to, trimethylamine, triethylamine, triethanolamine, diisopropylethylamine (Hunig's base), pyridine, 4-dimethylaminopyridine (DMAP), 1,4-diazabicyclo[2.2.2]octane (DABCO), or any mixture thereof.

Illustrative acid compounds that can be used to adjust the pH of the binder composition can include, but are not limited to, one or more mineral acids, one or more organic acids, one or more acid salts, or any mixture thereof. Illustrative mineral acids can include, but are not limited to, hydrochloric acid, nitric acid, phosphoric acid, sulfuric acid, or any mixture thereof. Illustrative organic acids can include, but are not limited to, acetic acid, formic acid, citric acid, oxalic acid, uric acid, lactic acid, or any mixture thereof. Illustrative acid salts can include, but are not limited to, ammonium sulfate, sodium, sodium bisulfate, sodium metabisulfite, or any mixture thereof.

As used herein, the term "lignocellulose" refers to a material that includes lignin and cellulose, hemicelluose, or a combination of cellulose and hemicelluloses. The lignocellulose substrates can be or include, but is not limited to, straw, hemp, sisal, cotton stalk, wheat, bamboo, sabai grass, rice straw, banana leaves, paper mulberry (e.g., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool or hair), recycled paper products (e.g., newspapers, cardboard, cereal boxes, and magazines), or any mixture thereof. Suitable woods can include softwoods and/or hardwoods. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, willow, or any mixture thereof.

The starting material, from which the lignocellulose substrates can be or can be derived from, can be shaped, reduced, or otherwise formed to the appropriate dimensions by various processes such as hogging, grinding, hammer milling, tearing, shredding, and/or flaking. Other processes for producing the substrates can include skiving, cutting, slicing, and/or sawing. Suitable forms of the lignocellulose substrates can include, but are not limited to, chips, flakes, wafers, fibers, shavings, sawdust or dust, veneer, or the like. Other suitable lignocellulose substrates can include, but are not limited to, wood chips, wood fibers, wood flakes, wood strands, wood wafers, wood shavings, wood particles, wood veneer, or any mixture thereof.

The particular configuration of the substrates can be based, at least in part, on the desired product. For example, particulates such as chips, fibers, shavings, sawdust or dust, or the like can be used for producing particleboards, fiberboards, and the like. The substrates can have a length of about 0.05 mm, about 0.1 mm, about 0.2 mm to about 1 mm, about 5 mm, about 10 mm, about 20 mm, about 30 mm, about 40 mm, about 50 mm, or about 100 mm. In another example, veneers, e.g., layers or sheets of wood, can be used for producing plywood, laminated veneer lumber, and the like. The veneers can have a thickness of about 0.8 mm, about 0.9 mm, about 1 mm, about 1.1 mm or about 1.2 mm to about 3 mm, about 4 mm, about 5 mm, about 6 mm, about 7 mm, about 8 mm, about 9 mm, or about 10 mm.

The lignocellulose substrates can include liquid on, about, and/or within the substrates. For example, the lignocellulose substrates can have a liquid concentration, e.g., a moisture content, of about 1 wt %, about 2 wt %, about 3 wt %, about 4 wt %, or about 5 wt % to about 7 wt %, about 8 wt %, about 9 wt %, about 10 wt %, about 11 wt %, or about 12 wt % based on a dry weight of the lignocellulose substrate. In another example, the lignocellulose substrates can have a liquid concentration of about 1 wt % to about 10 wt %, about 2 wt % to about 4 wt %, about 2 wt % to about 3 wt %, about 3 wt % to about 6 wt %, about 5 wt % to about 10 wt %, about 6 wt % to about 8 wt %, or about 4 wt % to about 9 wt %. The lignocellulose substrates can be fresh, e.g., not treated or dried, or dried and/or treated. For example, the lignocellulose substrates and/or the starting material from which the lignocellulose substrates were derived can be at least partially dried. In another example, the lignocellulose substrates can be washed and/or leached with an aqueous medium such as water.

Returning to the mixture, in one or more embodiments, the components of the binder composition can independently be added to or otherwise combined with the lignocellulose substrates to produce the mixture or resinated mixture. For example, the compound having two or more unsaturated carbon-carbon bonds can be combined with the lignocellulose substrates to produce an intermediate mixture. The free radical precursor can be combined with the intermediate mixture to produce the mixture or resinated furnish. In another example, the free radical precursor can be combined with the lignocellulose substrates to produce the intermediate mixture and the compound having two or more unsaturated carbon-carbon bonds can be combined with the intermediate mixture to produce the mixture or resinated furnish. In another example, the compound having two or more unsaturated carbon-carbon bonds and the free radical precursor can be combined, e.g., added to, the lignocellulose substrates simultaneously to produce the mixture or resinated furnish. Similarly, if the free radical precursor includes two or more components, e.g., an oxidant and a catalyst, the catalyst can be combined with the lignocellulose substrates as a mixture with the oxidant, independently with the lignocellulose substrates, with the unsaturated compound, or any combination thereof.

The components of the mixture can be contacted with one another via any suitable method. For example, the lignocellulose substrates can be in a vessel or other container and the free radical precursor, unsaturated compound, and/or catalyst can be sprayed onto the lignocellulose substrates. In another example, free radical precursor and unsaturated compound can be poured or brushed onto the lignocellulose substrates. In another example, the lignocellulose substrates can be directed, transported, introduced, or otherwise conveyed into a vessel already containing any one or more of the other components of the binder composition. Said another way, the lignocellulose substrates can be dipped, soaked, or otherwise contacted with the free radical precursor, the unsaturated prepolymer, or any mixture thereof.

The amount of the unsaturated compound in the mixture can widely vary. For example, the amount of the unsaturated compound in the mixture can be about 0.01 wt % to about 50 wt %, based on the dry weight of the lignocellulose substrates. In another example, the amount of the unsaturated compound in the mixture can be about 0.05 wt %, about 0.1 wt %, about 0.5 wt %, about 1 wt %, about 2 wt %, about 3 wt %, about 5 wt %, or about 7 wt % to about 15 wt %, about 20 wt %, about 25 wt %, or about 30 wt %, based on the dry weight of the lignocellulose substrates. In another example, the amount of the unsaturated compound in the mixture can be about 0.1 wt %, about 0.5 wt %, about 1 wt %, about 3 wt %, or about 5 wt % to about 10 wt %, about 13 wt %, about 15 wt %, about 17 wt %, or about 20 wt %, based on the dry weight of the lignocellulose substrates. In another example, the amount of the unsaturated compound in the mixture can be about 1 wt % to about 15 wt %, about 5 wt % to about 15 wt %, about 8 wt % to about 13 wt %, about 7 wt % to about 12 wt %, or about 5 wt % to about 25 wt %, based on the dry weight of the lignocellulose substrates. In another example, the amount of the unsaturated compound in the mixture can be at least 0.5 wt %, at least 1 wt %, at least 1.5 wt %, at least 2 wt %, at least 2.5 wt %, at least 3 wt %, at least 3.5 wt %, at least 4 wt %, at least 4.5 wt %, at least 5 wt %, at least 5.5 wt %, at least 6 wt %, at least 6.5 wt %, at least 7 wt %, or at least 7.5 wt % to about 8 wt %, about 9 wt %, about 10 wt %, about 12 wt %, about 15 wt %, about 20 wt %, about 25 wt %, about 30 wt %, about 35 wt %, about 40 wt %, about 45 wt %, or about 50 wt %, based on the dry weight of the lignocellulose substrates.

The amount of free radical precursor present in the mixture can depend, at least in part, on the particular composition of the free radical precursor, lignocellulose substrates, and/or the particular unsaturated compound and, thus, can widely vary. For example, the amount of radical precursor in the mixture can be about 0.05 wt %, about 0.1 wt %, about 0.5 wt %, or about 1 wt % to about 50 wt %, about 100 wt %, about 150 wt %, or about 200 wt %, based on the dry weight of the lignocellulose substrates. In another example, the amount of radical precursor in the mixture can be about 1 wt %, about 5 wt %, about 10 wt %, or about 20 wt % to about 80 wt %, about 100 wt %, about 120 wt %, or about 150 wt %, based on the dry weight of the lignocellulose substrates. In another example, the radical precursor can be present in the mixture in an amount of about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, or about 2 wt % to about 8 wt %, based on the dry weight of the lignocellulose substrates. In still another example, the free radical precursor can be present in the mixture in amount of about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt %, based on the dry weight of the lignocellulose substrates. In another example, the amount of the free radical precursor can be present in the mixture in an amount of at least 0.1 wt %, at least 0.3 wt %, at least about 0.5 wt %, at least about 0.7 wt %, at least about 1 wt %, at least about 1.3 wt %, at least about 1.5 wt %, at least about 1.7 wt %, at least about 2 wt %, at least about 2.3 wt %, or at least about 2.5 wt % to about 5 wt %, about 7 wt %, about 10 wt %, about 15 wt %, about 20 wt %, about 25 wt %, about 30 wt %, about 35 wt %, about 40 wt %, about 45 wt %, about 50 wt %, about 60 wt %, about 70 wt %, about 80 wt %, about 90 wt %, about 100 wt %, about 120 wt %, about 140 wt %, or about 100 wt %, based on the dry weight of the lignocellulose substrates.

In at least one specific embodiment, the free radical precursor can be or include an inorganic oxidant, and the amount of inorganic oxidant in the mixture can be about 0.05 wt %, about 0.1 wt %, about 0.5 wt %, or about 1 wt % to about 50 wt %, about 100 wt %, about 150 wt %, or about 200 wt %, based on the dry weight of the lignocellulose substrates. In another example, the inorganic oxidant can be present in the mixture in an amount of about 1 wt %, about 5 wt %, about 10 wt %, or about 20 wt % to about 80 wt %, about 100 wt %, about 120 wt %, or about 150 wt %, based on the dry weight of the lignocellulose substrates. In another example, the inorganic oxidant can be present in the mixture in an amount of about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, or about 2 wt % to about 8 wt %, based on the dry weight of the lignocellulose substrates. In still another example, the inorganic oxidant can be present in the mixture in amount of about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt %, based on the dry weight of the lignocellulose substrates. In yet another example, the inorganic oxidant can be present in the mixture in an amount of at least 0.1 wt %, at least 0.3 wt %, at least about 0.5 wt %, at least about 0.7 wt %, at least about 1 wt %, at least about 1.3 wt %, at least about 1.5 wt %, at least about 1.7 wt %, at least about 2 wt %, at least about 2.3 wt %, or at least about 2.5 wt % to about 5 wt %, about 7 wt %, about 10 wt %, about 15 wt %, about 20 wt %, about 25 wt %, about 30 wt %, about 35 wt %, about 40 wt %, about 45 wt %, about 50 wt %, about 60 wt %, about 70 wt %, about 80 wt %, about 90 wt %, about 100 wt %, about 120 wt %, about 140 wt %, or about 100 wt %, based on the dry weight of the lignocellulose substrates. In at least one specific embodiment, the inorganic oxidant can be hydrogen peroxide.

The amount of catalyst or free radical precursor catalyst, if present in the mixture, e.g., as a component of the free radical precursor, can widely vary. For example, the amount of catalyst in the mixture can be about 0.00001 wt %, about 0.0001 wt %, about 0.001 wt %, about 0.01 wt %, about 0.05 wt %, about 0.07 wt %, about 0.1 wt %, about 0.11 wt %, about 0.12 wt %, about 0.13 wt %, about 0.14 wt %, or about 0.15 wt % to about 0.25 wt %, about 0.27 wt %, about 0.3 wt %, about 0.33 wt %, about 0.35 wt %, bout 0.37 wt %, about 0.4 wt %, about 0.43 wt %, about 0.45 wt %, about 0.47 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, or about 6 wt %, based on the dry weight of the lignocellulose substrates. In another example, the amount of catalyst in the mixture can be about 0.01 wt % to about 1.5 wt %, about 0.1 wt % to about 1.3 wt %, about 0.05 wt % to about 0.5 wt %, or about 0.07 wt % to about 0.4 wt %, based on the dry weight of the lignocellulose substrates. In another example, the amount of the catalyst in the mixture can be about 0.001 wt % to about 0.5 wt %, about 0.15 wt % to about 0.35 wt %, about 0.1 wt % to about 0.4 wt %, about 0.1 wt % to about 2 wt %, about 0.05 wt % to about 3 wt %, or about 0.05 wt % to about 0.35 wt %, based on the dry weight of the lignocellulose substrates.

The pH of the mixture can be acidic, neutral, or basic. For example, the pH of the mixture can be about 0.5, about 2, about 3, or about 4 to about 7, about 7.5, about 8, about 8.5, or about 9. For example, the mixture can have a pH of about 1.5 to about 9, about 2.5 to about 7, about 1 to about 5, about 5 to about 8, or about 3 to about 6. The pH of the mixture can be adjusted to any desired pH by combining one or more base compounds and/or one or more acid compounds therewith. Suitable base compounds and/or acid compounds can include those discussed and described above and elsewhere herein.

One or more salts can optionally be combined with the lignocellulose substrates, the free radical precursor, the catalyst, the unsaturated prepolymer, and/or the binder composition. The amount of salt in the mixture, if present, can be about 1 wt %, about 2 wt %, or about 3 wt % to about 10 wt %, about 20 wt %, or about 30 wt %, based on the dry weight of the lignocellulose substrates. Illustrative metal cations include, but are not limited to, Al, Ca, K, Na, Cu, Zn, Mg, Mn, Ba, and/or Li cations. Suitable anions can include, but are not limited to, carbonates, chlorides, nitrates, silicates, acetates, formates, sulphates, phosphates, and/or other forms. Illustrative salts can include, for example, calcium carbonate, and/or sodium nitrate.

If any one or more of the components discussed and described herein include two or more different compounds, those two or more different compounds can be present in any ratio with respect to one another. Said another way, if the mixture includes a first and a second type of lignocellulose substrate, catalyst, free radical precursor, and/or unsaturated prepolymer the amount of the first and second components can be present in any desired ratio. For example, if the free radical precursor includes a first free radical precursor and a second free radical precursor, the mixture can have a free radical precursor composition that includes the first free radical precursor in an amount of about 1 wt % to about 99 wt % and conversely about 99 wt % to about 1 wt % of the second free radical precursor, based on the total weight of the first and second free radical precursors. In another example, the amount of the first free radical precursor can be about 5 wt %, about 10 wt %, about 15 wt %, about 20 wt %, about 25 wt % about 30 wt %, about 35 wt %, about 40 wt %, or about 45 wt % to about 60 wt %, about 65 wt %, about 70 wt %, about 75 wt %, about 80 wt %, about 85 wt %, about 90 wt %, or about 95 wt %, based on the total weight of the first and second free radical precursors.

The mixture can be heated to produce the lignocellulose containing composite product or "composite product." For example, the mixture can be heated to a temperature of about 60° C., about 90° C., about 120° C., about 150° C., or about 160° C. to about 170° C., about 200° C., about 230° C., about 260° C., or about 300° C. to produce the composite product. In another example, the mixture can be heated to a temperature of at least 60° C., at least 70° C., at least 80° C., at least 90° C., at least 100° C., at least 110° C., at least 120° C., at least 130° C., or at least 140° C. to about 150° C., about 155° C., about 160° C., about 165° C., about 170° C., about 180° C., about 200° C., about 225° C., about 250° C., about 275° C., or about 300° C. In another example, the mixture can be heated to a temperature of about 140° C. to about 200° C., about 155° C. to about 175° C., about 160° C. to about 210° C., about 160° C. to about 175° C., or about 145° C. to about 225° C.

In one or more embodiments, the mixture can be heated in air. In one or more embodiments, the mixture can be heated in an atmosphere that is inert or non-reactive with the mixture or substantially an inert atmosphere. If the mixture is heated in a substantially inert atmosphere the amount of oxygen can be less than 5 mol %, less than 3 mol %, less than 1 mol %, le less than 0.5 mol %, less than 0.1 mol % oxygen. Suitable inert gases can include, but are not limited to, nitrogen, argon, or a mixture thereof.

Heating the mixture can cause or promote at least partial curing of the mixture to produce the composite product. As used herein, the terms "curing," "cured," "at least partially curing," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the mixture is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the binder composition has been applied, to be altered.

When the mixture is heated, the mixture can contain at least a portion of the free radical precursor initially added to and present in the mixture. Said another way, at least a portion of the free radical precursor can remain unreacted or otherwise in the same form as when combined with the additional components of the mixture. For example, if the free radical precursor includes one or more oxidants, e.g., hydrogen peroxide ($H_2O_2$), at least a portion of the oxidant in the form of hydrogen peroxide can be present when heating of the mixture is initiated or started. In one or more embodiments, the mixture can contain at least 1%, at least 5%, at least 10%, at least 11%, at least 13%, at least 15%, at least 20%, at least 25%, at least 30%, at least 35%, at least 40%, at least 45%, at least 50%, at least 55%, at least 60%, at least 65%, or at least 70% of the total amount of free radical precursor initially present in the mixture, e.g., the total amount of the free radical precursor combined with the plurality of lignocellulose substrates and the one or more unsaturated compounds having two or more unsaturated carbon-carbon bonds, when the mixture is heated. In another example, the mixture can contain about 1% to about 100%, about 11% to about 95%, about 15% to about 85%, about 20% to about 90%, about 30% to about 80%, about 11% to about 100%, about 35% to about 75%, about 40% to about 70%, about 50% to about 70%, about 60% to about 80%, about 65% to about 85%, or about 30% to about 95% of the total amount of free radical precursor initially present in the mixture when the mixture is heated. In at least one specific example, if the mixture can include about 5 wt % free radical precursor, based on the dry weight of the lignocellulose substrates when the mixture is initially formed and when the mixture is heated to a temperature of 60° C. or more at least 11% of the free radical precursor can be present in the mixture. Said another way, if the mixture contains about 5 wt % of the one or more free radical precursors, based on the dry weight of the lignocellulose substrates, upon preparation or formation of the mixture, when heating the mixture is initiated or started, the mixture can have a free radical precursor concentration of at least 11% of the initial 5 wt % or 0.55 wt %, based on the dry weight of the lignocellulose substrates.

In one or more embodiments, the amount of the one or more free radical precursors present when the mixture is heated, e.g., to a temperature of about 60° C. to about 300° C., can be at least 0.5 wt %, at least 0.7 wt %, at least 1 wt %, at least 1.2 wt %, at least 1.5 wt %, at least 1.7 wt %, at least 2 wt %, at least 2.2 wt %, at least 2.5 wt %, at least 2.7 wt %, at least 3 wt %, at least 3.2 wt %, at least 3.5 wt %, at least 3.7 wt %, at least 4 wt %, at least 4.2 wt %, at least 4.5 wt %, at least 4.7 wt %, or at least 5 wt %, based on the dry weight of the plurality of lignocellulose substrates. For example, the amount of the one or more free radical precursors present when the mixture is heated can be about 1 wt %, about 1.5 wt %, about 1.6 wt %, about 1.8 wt %, or about 2.1 wt % to high of about 5 wt %, about 7 wt %, about 10 wt %, about 15 wt %, about 20 wt % or more, based on the dry weight of the plurality of lignocellulose substrates. In another example, the amount of the one or more free radical precursors present when the mixture is heated can be about 1 wt % to about 10 wt %, about 1.5 wt % to about 7 wt %, about 2 wt % to about 6 wt %, about 2.5 wt % to about 8 wt %, about 3 wt % to about 5.5 wt %, about 4 wt % to about 6.5 wt %, about 2.2 wt % to about 11 wt %, or about 2.3 wt % to about 6.3 wt %, based on the dry weight of the plurality of lignocellulose substrates.

The mixture can be heated as soon as the mixture is formed. The mixture can be kept, held, or otherwise maintained at a temperature less than 60° C. for a period of time prior to heating the mixture to a temperature of at least 60° C. At least one way an exothermic reaction between the components of the mixture can be substantially and/or significantly slowed and/or prevented such that the mixture does not significantly increase in temperature until the mixture is intentionally heated can be to select an appropriate free radial precursor or mixture of free radical precursors. In other words, the temperature of the mixture, without external heat directed to the mixture, can remain free from or substantially free from the development of an exotherm by selectively selecting an appropriate free radical precursor(s). The particular temperature of the mixture during the time period before heating can depend, at least in part, on the ambient or environmental temperature where the mixture is located. In one or more embodiments, the mixture can be maintained at a temperature of less than 60° C. without any intentional removal of heat therefrom. In one or more embodiments, the mixture can be maintained at a temperature of less than 60° C. with removal of heat therefrom, e.g., the mixture can be located within a refrigeration device and/or a cooled fluid such as chilled air can be directed toward and/or passed through the mixture. In one or more embodiments, the mixture can be maintained at a temperature of less than 60° C. by controlling or adjusting a water concentration of the mixture. For example, increasing the water concentration of the mixture can reduce, inhibit, or prevent the mixture from undergoing an exothermic reaction.

Prior to heating the mixture to a temperature of at least 60° C., the mixture can be maintained at a temperature less than 60° C., less than 55° C., less than 50° C., less than 45° C., less than 40° C., less than 35° C., or less than 30° C. for at least 10 minutes, at least 13 minutes, at least 15 minutes, at least 17 minutes, at least 20 minutes, at least 23 minutes, at least 25 minutes, at least 27 minutes, at least 30 minutes, at least 33 minutes, at least 35 minutes, at least 37 minutes, at least 40 minutes, at least 43 minutes, at least 45 minutes, at least 47 minutes, at least 50 minutes, at least 53 minutes, at least 55 minutes, at least 57 minutes, or at least 60 minutes. For example, the mixture can be maintained at a temperature less than 60° C. for at least 10 minutes to about 30 minutes, at least about 15 minutes to about 35 minutes, at least about 20 minutes to about 40 minutes, at least about 18 minutes to about 45 minutes, or at least about 15 minutes to about 40 minutes prior to heating the mixture to a temperature of at least 60° C. In another example, the mixture can be maintained at a temperature less than 60° C. for at least 10 minutes, about 30 minutes, about 45 minutes, about 1 hour, about 2 hours, about 3 hours, about 5 hours, about 12 hours, about 18 hours, about 24 hours, or about 30 hours prior to heating the mixture to a temperature of at least 60° C.

Prior to heating the mixture to a temperature of at least 60° C., the amount of energy generated from the mixture due to exothermic reaction(s) between the components of the mixture can be less than 20 cal/g of the mixture, less than 18 cal/g of the mixture, less than 16 cal/g of the mixture, less than 15 cal/g of the mixture, less than 14 cal/g of the mixture, or less than 13.8 cal/g of the mixture. For example, prior to heating the mixture to a temperature of at least 60° C., the amount of energy generated from the mixture due to exothermic reaction(s) between the components of the mixture can be less than 14 cal/g, less than 13.5 cal/g, less than 13 cal/g, less than 12.5 cal/g, less than 12 cal/g, less than 11.5 cal/g, less than 11 cal/g, less than 10.5 cal/g, less than 10 cal/g, less than 9.5 cal/g, less than 9 cal/g, less than 8.5 cal/g, less than 8 cal/g, less than 7.5 cal/g, less than 7 cal/g, less than 6.5 cal/g, less than 6 cal/g, less than 5.5 cal/g, less than 5 cal/g, less than 4.5 cal/g, less than 4 cal/g, less than 3.5 cal/g, less than 3 cal/g, less than 2.5 cal/g. less than 2 cal/g, less than 1.5 cal/g, less than 1 cal/g, or less than 0.5 cal/g of the mixture.

Illustrative composite products discussed and described herein can include, but are not limited to, particleboard, fiberboard such as medium density fiberboard (MDF) and/or high density fiberboard (HDF), plywood such as hardwood plywood and/or softwood plywood, oriented strand board (OSB), laminated veneer lumber (LVL), laminated veneer boards (LVB), engineered wood flooring, and the like. Composite products in the shape or form of a panel, sheet, board, or the like can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the mixture can be heated for a time of about 5 seconds per millimeter (s/mm), about 10 s/mm, about 12 s/mm, or about 15 s/mm to about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product. For example, the mixture can be heated for a time of about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another example, the mixture can be heated for a time less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific example, a composite product in the form of a panel, sheet, board, or the like and having an average thickness of about 15 mm and subjected to a total heating time of about 4 minutes would correspond to heating the mixture for about 16 s/mm. In at least one specific example, the mixture can be heated to a temperature of about 160° C. to about 170° C. for a time of 13 s/mm to about 19 s/mm.

Pressure can optionally be applied to the mixture before, during, and/or after the mixture is heated to produce the composite product. For example, if the desired composite product shape or structure is a panel, sheet, board, or the like, an amount of the mixture sufficient to produce a composite product of the desired size, can be transported, directed, placed, introduced, disposed, or otherwise located within a press capable of pressing the mixture before the mixture is heated and/or when the mixture is heated. The press can be an open press or a closed press. In at least one specific embodiment, an open press can be used to press the mixture when the mixture is heated, e.g., to a temperature of about 100° C. to about 250° C. In another example, the mixture can be extruded through a die (extrusion process) and heated to produce the composite product. The mixture can be pressed under a pressure of about 0.5 MPa, about 1 MPa, about 3 MPa, or about 5 MPa to about 7 MPa, about 9 MPa, or about 11 MPa.

Illustrative open presses can be as discussed and described in U.S. Pat. Nos. 4,017,248; 5,337,655; 5,611,269; 5,950,532; 6,098,532; and 6,782,810. Suitable, commercially available, open presses can include, but are not limited to, the CONTIROLL® press available from Siempelkamp and the CPS press available from Dieffenbacher.

The composite product can have a density of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.9 g/cm$^3$, about 0.93 g/cm$^3$, about 0.95 g/cm$^3$, about 0.97 g/cm$^3$, about 1 g/cm$^3$, about 1.05 g/cm$^3$, about 1.1 g/cm$^3$, or about 1.2 g/cm$^3$. For example, the composite product can have a density of about 0.5 g/cm$^3$ to about 1 g/cm$^3$, about 0.7 g/cm$^3$ to about 0.75 g/cm$^3$, about 0.65 g/cm$^3$ to about 0.85 g/cm$^3$, about 0.65 g/cm$^3$ to about 0.8 g/cm$^3$, about 0.67 g/cm$^3$ to about 0.77 g/cm$^3$, or about 0.64 g/cm$^3$ to about 0.8 g/cm$^3$. In one or more embodiments, the composite product can have density of less than 0.88 g/cm$^3$, less than 0.85 g/cm$^3$, less than 0.83 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$ and at least 0.5 g/cm$^3$, at least 0.55 g/cm$^3$, at least 0.6 g/cm$^3$, at least 0.65 g/cm$^3$, or at least 0.7 g/cm$^3$.

The composite product can have an internal bond strength of about 0.1 MPa, about 0.2 MPa, about 0.3 MPa, about 0.35 MPa, about 0.4 MPa, about 0.5 MPa, about 0.6 MPa, about 0.7 MPA, about 0.8 MPa, about 0.9 MPa, about 1 MPa, or about 1.1 MPa to about 1.5 MPa, about 2 MPa, about 2.5 MPa, about 3 MPa, about 3.5 MPa, about 4 MPa, or about 5 MPa. For example, the composite product can have an internal bond strength of about 0.35 MPa to about 5.5 MPa, about 0.4 MPa to about 4.6 MPa, about 0.48 MPa to about 3.8 MPa, about 0.6 MPa to about 3.2 MPa, about 0.8 MPa to about 2.6 MPa, or about 0.5 MPa to about 2.1 MPa. In another example, the composite product can have an internal bond strength of about 0.5 MPa to about 2 MPa, about 0.6 MPa to about 1.6 MPa, about 1 MPa to about 1.7 MPa, about 0.6 MPa to about 1.2 MPa, or about 0.55 MPa to about 1.5 MPa. In one or more embodiments, the composite product can have an internal bond strength of at least 0.3 MPa, at least 0.33 MPa, at least 0.35 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.65 MPa, at least 0.69 MPa, at least 0.72 MPa, at least 0.76 MPa, or at least 0.79 MPa. The internal bond strength for each example can be determined according to the test procedure provided for in ASTM D1037-06a.

In one or more embodiments, the composite product can have an internal bond strength of at least 0.4 MPa and can contain about 3 wt % of the unsaturated compound. In one or more embodiments, the composite product can have an internal bond strength of at least 0.4 MPa and can contain at least 3 wt % of the unsaturated compound. In one or more embodiments, the composite product can have an internal bond strength of at least 0.4 MPa and can contain 3 wt % or less of the unsaturated compound. In one or more embodiments, the composite product can have an internal bond strength of about 0.5 MPa and can contain about 3.5 wt % of the unsaturated compound. In one or more embodiments, the composite product can have an internal bond strength of at least 0.5 MPa and can contain at least 3.5 wt % of the unsaturated compound. In one or more embodiments, the composite product can have an internal bond strength of at least 0.5 MPa and can contain 3.5 wt % or less of the unsaturated compound. In one or more embodiments, the composite product can have an internal bond strength of at least 0.6 MPa and can contain about 4 wt % of the unsaturated compound. In one or more embodiments, the composite product can have an internal bond strength of at least 0.6 MPa and can contain at least 4 wt % of the unsaturated compound. In one or more embodiments, the composite product can have an internal bond strength of at least 0.6 MPa and can contain 4 wt % or less of the unsaturated compound. In one or more embodiments, the composite product can have an internal bond strength of at least 0.8 MPa and can contain about 6 wt % of the unsaturated compound. In one or more embodiments, the composite product can have an internal bond strength of at least 0.8 MPa and can contain at least 6 wt % of the unsaturated compound. In one or more embodiments, the composite product can have an internal bond strength of at least 0.8 MPa and can contain 6 wt % or less of the unsaturated compound. In one or more embodiments, the composite product can have an internal bond strength of at least 0.85 MPa and can contain about 6 wt % of the unsaturated compound. In one or more embodiments, the composite product can have an internal bond strength of at least 0.85 MPa and can contain at least 6 wt % of the unsaturated compound. In one or more embodiments, the composite product can have an internal bond strength of at least 0.85 MPa and can contain 6 wt % or less of the unsaturated compound. In one or more embodiments, the composite product can have an internal bond strength of at least 1.1 MPa and can contain about 8 wt % of the unsaturated compound. In one or more embodiments, the composite product can have an internal bond strength of at least 1.1 MPa and can contain at least 8 wt % of the unsaturated compound. In one or more embodiments, the composite product can have an internal bond strength of at least 1.1 MPa and can contain 8 wt % or less of the unsaturated compound.

In one or more embodiments, the composite product can have a density of less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$ and an internal bond strength of at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.690 MPa. In at least one specific example, the composite product can have a density of less than 0.8 g/cm$^3$ and an internal bond strength of at least 0.48 MPa. In at least one other specific example, the composite product can have a density of less than 0.8 g/cm$^3$ and an internal bond strength of at least 0.69 MPa. In at least one other specific example, the composite product can have a density of less than 0.73 g/cm$^3$ and an internal bond strength of at least 0.48 MPa. In still another example, the composite product can have a density of less than 0.73 g/cm$^3$ and an internal bond strength of at least 0.58 MPa. In another example, the composite product can have a density of less than 0.77 g/cm$^3$ and an internal bond strength of at least 0.58 MPa.

Composite products such as particleboard, fiberboard, plywood, and oriented strand board, can have a thickness or average thickness of about 1.5 mm, about 5 mm, or about 10 mm to about 30 mm, about 50 mm, about 100 mm, about 200 mm, or about 300 mm. Composite products such as particleboard, fiberboard, plywood, and oriented strand board can have a length of about 0.1 m, about 0.5 m, about 1 m, about 1.2 m, about 1.8 m, about 2.4 m, about 3 m, or about 3.6 m. The composite products can also have a width of about 0.1 m, about 0.5 m, about 1 m, about 1.2 m, about 1.8 m, about 2.4 m, or about 3 m.

The mixtures discussed and described herein can be free or essentially free of formaldehyde for use in the production of the composite products, e.g., wood products such as particleboard and plywood. As used herein, the term "essentially free of formaldehyde" means the mixture does not include or contain any intentionally added formaldehyde or compounds that can decompose, react, or otherwise form formaldehyde. Said another way, the term "essentially free of formaldehyde" means the mixture does not contain formaldehyde or compounds that can form formaldehyde, but may include formaldehyde present as an impurity. Accordingly, depending on the particular multifunctional aldehyde(s) used to produce the mixtures discussed and described herein, the mixture can be referred to as "no added formaldehyde" or "NAF" mixture.

The composite products discussed and described herein can exhibit a low level of formaldehyde emission. A suitable test for determining formaldehyde emission from a composite product can include ASTM D6007-02 and AST E1333-10. For example, the composite products can exhibit a formaldehyde emission of zero. In another example, the composite products can exhibit a formaldehyde emission of less than 1 part per million (ppm), less than 0.9 ppm, less than 0.08 ppm, less than 0.07 ppm, less than 0.06 ppm, less than 0.05 ppm, less than 0.04 ppm, less than 0.03 ppm, less than 0.02 ppm, less than 0.01 ppm, or less than 0.005 ppm.

The composite product can meet or exceed the formaldehyde emission standards required by the California Air Resources Board (CARB) Phase 1 (less than 0.1 parts per million "ppm" formaldehyde for particleboard), and Phase 2 (less than 0.09 ppm formaldehyde for particleboard). The composite products discussed and described herein can also meet or exceed the formaldehyde emission standards required by the Japanese JIS/JAS F* (does not exceed 0.5 mg/L formaldehyde for particleboard), Japanese JIS/JAS F** (does not exceed 0.3 mg/L formaldehyde for particleboard), European E1, and European E2 standards.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Six unsaturated prepolymers (Prepolymers A-F) were prepared and particleboard panels were made with the unsaturated prepolymers as part of the binder composition. More particularly, Prepolymers A-F were used to make the particleboard panels of Examples 1-2, 3-4, 5-6, 7-9, 10-13, and 14-15, respectively. All prepolymers were used within 24 hours of synthesis.

Prepolymer A was synthesized from pentaerythritol and maleic anhydride. Maleic anhydride (205.8 g, 2.1 mol, purchased from across) and pentaerythritol (95.2 g, 0.7 mol, purchased from Acros) were added to a 500 mL 3-neck round-bottom flask equipped with a mechanical stirrer, a thermocouple, and a reflux condenser. The reactant mixture was heated from room temperature to 60° C. and after 30 minutes the temperature was increased to 120° C. The reaction mixture was stirred at 120° C. for 1 hour and the reactant mixture gradually turned into a light yellow solution. The reaction mixture was cooled in air to less than 100° C. and water was added to make a 75 wt % solution. $^{13}$C NMR analysis of the polymer (not diluted in water) showed that there is no free pentaerythritol left, monosubstituted pentaerythritol 1.4%, disubstituted pentaerythritol 13.3%, trisubstituted pentaerythritol 44.4%, and tetrasubstituted pentaerythritol 41.1%.

Prepolymer B was synthesized from glycerol and itaconic acid. Itaconic acid (800 g, 6.15 moles, sample from Cargill), glycerol (800, 8.69 moles, purchased from Aldrich), Fascat 4201 (1.6 g, from Archema Inc.), and hydroquinone (1.6 g from Aldrich) were added to a 1 L glass reactor equipped with a mechanical stirrer, a thermocouple, a moisture-trap with a three-way stopcock, and a cold-finger reflux condenser. The reaction was conducted under a constant nitrogen purge. Over the course of 1 hour, the reaction mixture was heated from room temperature to 182° C. when water began to be collected in the moisture trap. The reaction mixture was heated over the next hour up to 202° C. at which point 174.5 g of condensate water had been collected. The glass reactor was placed in an ice bath and cooled to less than 100° C. After cooling to less than 100° C., 533 g of a 50% aqueous hydrogen peroxide solution (purchased from Degussa) was mixed with the cooled reaction product. The product, Prepolymer B, was stored in a plastic container.

Prepolymer C was synthesized from glycerol and maleic anhydride. Maleic anhydride (645 g, 6.58 mol, purchased from Fisher), glycerol (855 g, 9.3 mol, purchased from Aldrich), Fascat 4201 (1.5 g, purchased from Archema Inc.), and Hydroquinone (1.5 g purchased from Aldrich) were added to a 1 L glass reactor equipped with a mechanical stirrer, a thermocouple, a moisture-trap with a three-way stopcock, and a cold-finger reflux condenser. Over the course of 20 minutes, the reaction mixture was heated from room temperature to 72° C., over which period the maleic anhydride melted. When the temperature of the reaction mixture reached 72° C., the heating mantle was removed and the reaction was allowed to exotherm from 72° C. to 115° C. When the temperature reached 115° C., the heating mantle was replaced and the reaction mixture was heated to 158° C. when water began collecting in the moisture trap. The reaction mixture was heated to 206° C. at which point 98.1 g of condensate water had been collected. The glass reactor was placed in an ice bath and cooled to less than 100° C. After cooling to less than 100° C., 118 g of water was mixed with the cooled reaction product to lower the viscosity of the solution. The product, Prepolymer C, was stored in a plastic container Prepolymer D was synthesized from glycerol and maleic anhydride. Maleic anhydride (783 g, 8 mol, purchased from Fisher), glycerol (734 g, 8 mol, purchased from Aldrich), and Fascat 4201 (1.5 g, from Archema Inc.) were added to a 1 L glass reactor equipped with a mechanical stirrer, a thermocouple, a moisture-trap with a three-way stopcock, and a cold-finger reflux condenser. Over the course of 20 minutes the reaction mixture was heated from room temperature to 80° C., over which period the maleic anhydride melted. When the temperature of the reaction mixture reached 80° C., the heating mantle was removed and the reaction mixture was allowed to exotherm to 164° C. at which point water began to distill off from the reaction mixture. The loss of water cooled the mixture to 155° C. The heating mantle was replaced, and the reaction mixture was maintained at 155° C., but no more water was collected. The total amount of water collected was 5.4 g. The glass reactor was placed in an ice bath and cooled to less than 100° C. After cooling to less than 100° C., 360 g of the reaction mixture was combined with 120 g of 50% aqueous hydrogen peroxide solution (purchased from Degussa). Prepolymer D was stored in a plastic container.

Prepolymer E was synthesized from polyglycerol and maleic anhydride. Polyglycerol (908 g, purchased from Cargill), was added to a 2 liter resin kettle. The polyglycerol was heated to a temperature of 65° C. and 518 g of powdered maleic anhydride (Aldrich Chemicals) was added. The reaction mixture was allowed to exotherm to about 90° C. over 30 minutes. A second charge of 420 g of maleic anhydride was added and the temperature was allowed to exotherm to 105° C. over 30 minutes and was held at 105° C. for an additional 90 minutes. The extent of the reaction was monitored by infrared spectroscopy. When most of the maleic anhydride had reacted (disappearance of the anhydride bands in IR spectra) the reaction was cooled to about 70° C. followed by the addition of 720 g of water. The mixture was then stirred until all the polyester had dissolved to produce Prepolymer E. Prepolymer E as stored in a plastic container.

Prepolymer F was synthesized from polyglycerol, maltodextrin, and maleic anhydride: Polyglycerol (280 g, purchased from Cargill) and 200 g of maltodextrin (ADM) were added to a resin kettle. The temperature of the mixture was raised to about 65° C. To the resulting white slurry was added 450 g of maleic anhydride in four portions over 3 hours. During the course of these additions the temperature of the reaction was gradually increased to 115° C. and held for an additional 30 minutes. The progress of the reaction was monitored by infrared spectroscopy. When most of the maleic anhydride had reacted (disappearance of the anhydride bands in IR spectra) the reaction mixture was cooled to about 70° C. followed by the addition of 250 g of water. The reaction mixture was stirred until all the polyester had dissolved. Prepolymer F was stored in a plastic container.

For all examples (Ex. 1-15), 2,100 grams of face-grade wood particles (Southern Yellow Pine) was placed in 0.0283 m$^3$ blender. The wood particles had a moisture content of 5 wt % to 7 wt %. The components of the binder composition were then added to the wood particles in the form of a fine mist. The components were added in the following order: a) 4 wt % to 8 wt % of the unsaturated polyester prepolymer (70-85% aq.), b) 2 wt % to 4.5% hydrogen peroxide (50% aq.), and c) 0.17 wt % iron sulfate, with all amounts based on the dry weight of the wood particles. The resinated furnish had a moisture content of 13 wt % to 16 wt % and was blended for 2 minutes after addition of the iron sulfate. The resinated furnish was placed in a 40.64 cm×40.64 cm×5.08 cm form and pressed to stops configured to produce a panel having a thickness of 1.58 cm+/−0.2 cm for 4 min at 165.5° C. (total press time of 240 sec included a 30 sec closing time, a 180 sec press time at about 8,273.7 and a 30 sec degas time). The particleboard samples were then cooled to room temperature and internal bond (IB) strength was tested according to ASTM D1037-06a.

TABLE 1

| Example | Pre-polymer | Pre-polymer | $H_2O_2$[3] | $FeSO_4$ | Density (g/cm$^3$) | IB (MPa) |
|---|---|---|---|---|---|---|
| | | % Loading (Dry Weight of Wood Particles) | | | | |
| 1 | A | 4.5 | 2.0 | 0.1 | 0.82 | 0.82 |
| 2 | A | 8.0 | 2.0 | 0.1 | 0.85 | 1.33 |
| 3 | B | 4.0 | 2.0 | 0.1 | 0.80 | 0.72 |
| 4 | B | 8.0 | 2.0 | 0.1 | 0.79 | 0.99 |
| 5 | C | 5.5 | 2.0 | 0.1 | 0.82 | 0.77 |
| 6 | C | 8.0 | 2.0 | 0.1 | 0.82 | 0.88 |
| 7 | D | 4.5 | 4.5 | 0.1 | 0.82 | 0.38 |
| 8 | D | 5.5 | 2.0 | 0.1 | 0.81 | 0.43 |
| 9 | D | 8.0 | 2.0 | 0.1 | 0.81 | 0.61 |
| 10 | E | 4.0 | 2.0 | 0.1 | 0.79 | 0.61 |
| 11 | E | 8.0 | 2.0 | 0.1 | 0.83 | 1.11 |
| 12 | E[1] | 4.0 | 2.0 | 0.1 | 0.82 | 0.71 |
| 13 | E[1] | 8.0 | 2.0 | 0.1 | 0.85 | 1.53 |
| 14 | F | 6.0 | 2.0 | 0.1 | 0.81 | 0.81 |
| 15 | F[2] | 6.0 | 2.0 | 0.1 | 0.81 | 0.83 |

[1]Includes 20% TMPTA as an additive
[2]Includes 5% TMPTA as an additive
[3]Total loading of $H_2O_2$ ($H_2O_2$ used as a diluent is taken into account)

As shown in Table 1, particleboard panels having a density of 0.79 g/cm$^3$ to 0.85 g/cm$^3$ and an internal bond strength from 0.38 MPa all the way up to 1.53 MPa were made.

Embodiments of the present disclosure further relate to any one or more of the following paragraphs:

1. A binder composition, comprising: at least one unsaturated compound having two or more unsaturated carbon-carbon bonds, wherein at least one of the unsaturated carbon-carbon bonds is a pi-bond that is not conjugated with an aromatic moiety and is capable of free radical addition; and at least one free radical precursor, wherein the free radical precursor is present in an amount of about 7 wt % to about 99 wt %, based on the weight of the one or more unsaturated compounds.

2. A binder composition, comprising: at least one unsaturated compound having two or more unsaturated carbon-carbon bonds, wherein at least one of the unsaturated carbon-carbon bonds is a pi-bond that is not conjugated with an aromatic moiety and is capable of free radical addition; at least one catalyst; and at least one oxidant, wherein the oxidant is present in an amount of about 7 wt % to about 99 wt %, based on the weight of the one or more unsaturated compounds.

3. A binder composition, comprising: at least one unsaturated compound having two or more unsaturated carbon-carbon bonds, wherein at least one of the unsaturated carbon-carbon bonds is a pi-bond that is not conjugated with an aromatic moiety and is capable of free radical addition; and at least one free radical precursor comprising potassium ferricyanide, iron (S,S)-ethylenediamine-N,N'-disuccinic acid, iron ethyleneglycol bis(2-aminoethylether)-N,N,N',N'-tetraacetic acid, iron trans-1,2-diaminocyclohexanetetraacetic acid, nitrilotriacetic acid, or any mixture thereof.

4. A method for making a composite product, comprising: combining a plurality of lignocellulose substrates, at least one unsaturated compound, and at least one free radical precursor to produce a mixture, wherein the unsaturated compound has two or more unsaturated carbon-carbon bonds, and wherein at least one of the unsaturated carbon-carbon bonds is a pi-bond that is not conjugated with an aromatic moiety and is capable of free radical addition; and heating the mixture to a temperature of about 60° C. to about 300° C. to produce a composite product.

5. A method for making a composite product, comprising: contacting a plurality of lignocellulose substrates with a binder composition comprising at least one unsaturated compound and at least one free radical precursor to produce a mixture, wherein the unsaturated compound has two or more unsaturated carbon-carbon bonds, and wherein at least one of the unsaturated carbon-carbon bonds is a pi-bond that is not conjugated with an aromatic moiety and is capable of free radical addition; and at least partially curing the binder composition to produce a composite product.

6. A method for making a composite product, comprising: combining a plurality of lignocellulose substrates, at least one unsaturated compound, and at least one free radical precursor to produce a mixture, wherein the unsaturated compound has two or more unsaturated carbon-carbon bonds, wherein at least one of the unsaturated carbon-carbon bonds is a pi-bond that is not conjugated with an aromatic moiety and is capable of free radical addition, and wherein the free radical precursor is present in an amount of about 7 wt % to about 99 wt %, based on the weight of the one or more unsaturated compounds; and heating the mixture to a temperature of about 60° C. to about 300° C. to produce a composite product.

7. A method for making a composite product, comprising: contacting a plurality of lignocellulose substrates with a binder composition comprising at least one unsaturated compound and at least one free radical precursor to produce a mixture, wherein the unsaturated compound has two or more unsaturated carbon-carbon bonds, wherein at least one of the unsaturated carbon-carbon bonds is a pi-bond that is not conjugated with an aromatic moiety and is capable of free radical addition, and wherein the free radical precursor is present in an amount of about 7 wt % to about 99 wt %, based on the weight of the one or more unsaturated compounds; and at least partially curing the binder composition to produce a composite product.

8. A method for making a composite product, comprising: combining a plurality of lignocellulose substrates, one or more unsaturated compounds, one or more oxidants, and one or more catalysts to produce a mixture, wherein the one or more unsaturated compounds has two or more unsaturated carbon-carbon bonds, wherein at least one of the unsaturated carbon-carbon bonds is a pi-bond that is not conjugated with an aromatic moiety and is capable of free radical addition, and wherein the one or more catalysts comprises a plurality of transition metal atoms each bound to a corresponding complexing agent; and heating the mixture to a temperature of about 60° C. to about 300° C. to produce a composite product, wherein at least 11 wt % of the one or more oxidants present in the mixture is present when the mixture is heated to about 60° C. to about 300° C.

9. A method for making a composite product, comprising: combining a plurality of lignocellulose substrates, one or more unsaturated compounds, one or more oxidants, and one or more catalysts to produce a mixture, wherein the one or more unsaturated compounds has two or more unsaturated carbon-carbon bonds, wherein at least one of the unsaturated carbon-carbon bonds is a pi-bond that is not conjugated with an aromatic moiety and is capable of free radical addition, and wherein the one or more catalysts comprises a plurality of transition metal atoms each bound to a corresponding complexing agent; and heating the mixture to a temperature of about 60° C. to about 300° C. to produce a composite product, wherein the one or more oxidants is present in an amount of about 11 wt %, based on the dry weight of the plurality of lignocellulose substrates when the mixture is heated to about 60° C. to about 300° C.

10. A method for making a composite product, comprising: combining a plurality of lignocellulose substrates, at least one unsaturated compound, and at least one free radical precursor to produce a mixture, wherein the unsaturated compound has two or more unsaturated carbon-carbon bonds, wherein at least one of the unsaturated carbon-carbon bonds is a pi-bond that is not conjugated with an aromatic moiety and is capable of free radical addition, and wherein the free radical precursor comprises potassium ferricyanide, iron (S,S)-ethylenediamine-N,N'-disuccinic acid, iron ethyleneglycol bis(2-aminoethylether)-N,N,N',N'-tetraacetic acid, iron trans-1,2-diaminocyclohexanetetraacetic acid, nitrilotriacetic acid, or any mixture thereof; and heating the mixture to a temperature of about 60° C. to about 300° C. to produce a composite product.

11. A composite product, comprising a plurality of lignocellulose substrates and an at least partially cured binder composition, wherein the binder composition, prior to at least partial curing, comprises at least one unsaturated compound and at least one free radical precursor, wherein the unsaturated compound has two or more unsaturated carbon-carbon bonds, and wherein at least one of the unsaturated carbon-carbon bonds is a pi-bond that is not conjugated with an aromatic moiety and is capable of free radical addition.

12. A composite product, comprising a plurality of lignocellulose substrates and an at least partially cured binder composition, wherein the binder composition, prior to at least partial curing, comprises: at least one unsaturated compound having two or more unsaturated carbon-carbon bonds, wherein at least one of the unsaturated carbon-carbon bonds is a pi-bond that is not conjugated with an aromatic moiety and is capable of free radical addition; and at least one free radical precursor, wherein the free radical precursor is present in an amount of about 7 wt % to about 99 wt %, based on the weight of the one or more unsaturated compounds.

13. A composite product, comprising: an at least partially cured composition having a density of less than 1 g/cm³ and an internal bond strength of at least 0.35 MPa, wherein the at least partially composition, prior to curing, comprises a plurality of lignocellulose substrates, at least one unsaturated compound, and at least one free radical precursor, wherein: the unsaturated compound has two or more unsaturated carbon-carbon bonds, at least one of the unsaturated carbon-carbon bonds is a pi-bond that is not conjugated with an aromatic moiety and is capable of free radical addition, and the free radical precursor is present in an amount of about 7 wt % to about 99 wt %, based on the weight of the one or more unsaturated compounds.

14. A composite product, comprising: an at least partially cured composition having a density of less than 1 g/cm³ and an internal bond strength of at least 0.35 MPa, wherein the at least partially composition, prior to curing, comprises a plurality of lignocellulose substrates, at least one unsaturated compound, and at least one free radical precursor, wherein the unsaturated compound has two or more unsaturated carbon-carbon bonds, and wherein at least one of the unsaturated carbon-carbon bonds is a pi-bond that is not conjugated with an aromatic moiety and is capable of free radical addition.

15. A composite product comprising a mixture that has been heated to a temperature of about 60° C. to about 300° C., wherein the mixture, prior to being heated, comprises a plurality of lignocellulose substrates, at least one unsaturated compound, and at least one free radical precursor, wherein the unsaturated compound has two or more unsaturated carbon-carbon bonds, and wherein at least one of the unsaturated carbon-carbon bonds is a pi-bond that is not conjugated with an aromatic moiety and is capable of free radical addition.

16. A composite product comprising a mixture that has been heated to a temperature of about 60° C. to about 300° C., wherein the mixture, prior to being heated, comprises a plurality of lignocellulose substrates, at least one unsaturated compound, and at least one free radical precursor, wherein the unsaturated compound has two or more unsaturated carbon-carbon bonds, wherein at least one of the unsaturated carbon-carbon bonds is a pi-bond that is not conjugated with an aromatic moiety and is capable of free radical addition, and wherein the heated mixture has an internal bond strength of at least 0.35 MPa and a density of less than 1 g/cm³.

17. A composite product having an internal bond strength of at least 0.35 MPa and a density of less than 1 g/cm³, wherein the composite product comprises a cured mixture of a plurality of lignocellulose substrates, at least one unsaturated compound, and at least one free radical precursor, wherein the unsaturated compound has two or more unsaturated carbon-carbon bonds, wherein at least one of the unsaturated carbon-carbon bonds is a pi-bond that is not conjugated with an aromatic moiety and is capable of free radical addition.

18. A composite product comprising a cured mixture of a plurality of lignocellulose substrates, at least one unsaturated compound, and at least one free radical precursor, wherein the unsaturated compound has two or more unsaturated carbon-carbon bonds, wherein at least one of the unsaturated carbon-carbon bonds is a pi-bond that is not conjugated with an aromatic moiety and is capable of free radical addition.

19. A composite product having an internal bond strength of at least 0.35 MPa and a density of less than 1 g/cm³, wherein the composite product comprises a mixture that has been heated to a temperature of about 60° C. to about 300° C., and wherein prior to heating the mixture comprises a plurality of lignocellulose substrates, one or more unsaturated compounds, and one or more free radical precursors, wherein the one or more unsaturated compounds has two or more unsaturated carbon-carbon bonds, wherein at least one of the unsaturated carbon-carbon bonds is a pi-bond that is not conjugated with an aromatic moiety and is capable of free radical addition.

20. A composite product comprising a plurality of lignocellulose substrates and an at least partially cured binder composition, wherein the binder composition, prior to at least partial curing, comprises at least one unsaturated compound, at least one catalyst, and at least one oxidant, wherein the unsaturated compound has two or more unsaturated carbon-carbon bonds, and wherein at least one of the unsaturated carbon-carbon bonds is a pi-bond that is not conjugated with an aromatic moiety and is capable of free radical addition.

21. A composite produce comprising a plurality of lignocellulose substrates and an at least partially cured binder composition, wherein the binder composition, prior to at least partial curing, comprises at least one unsaturated compound and at least one free radical precursor, wherein the unsaturated compound has two or more unsaturated carbon-carbon bonds, wherein at least one of the unsaturated carbon-carbon bonds is a pi-bond that is not conjugated with an aromatic moiety and is capable of free radical addition, and wherein the free radical precursor comprises potassium ferricyanide, iron (S,S)-ethylenediamine-N,N'-disuccinic acid, iron ethyleneglycol bis(2-aminoethylether)-N,N,N',N'-tetraacetic acid, iron trans-1,2-diaminocyclohexanetetraacetic acid, nitrilotriacetic acid, or any mixture thereof.

22. The binder composition, method, or composite product according to any one of paragraphs 1, 3-7, and 10-19, and 21, wherein the free radical precursor comprises a mixture of one or more inorganic oxidants and one or more catalysts.

23. The binder composition, method, or composite product according to any one of paragraphs 1, 3-7, and 10-19, and 21, wherein the free radical precursor comprises a mixture of hydrogen peroxide and one or more iron containing catalysts.

24. The binder composition, method, or composite product according to any one of paragraphs 1, 3-7, and 10-19, and 21, wherein the free radical precursor is present in an amount of at least 30 wt % to about 99 wt %, based on the weight of the one or more unsaturated compounds.

25. The binder composition, method, or composite product according to any one of paragraphs 1, 3-7, and 10-19, and 21, wherein the free radical precursor comprises a mixture of hydrogen peroxide and one or more catalysts, wherein the hydrogen peroxide is present in an amount of about 10 wt % to about 80 wt %, based on the combined weight of the unsaturated compound and the free radical precursor, and wherein the one or more catalysts is present in an amount of about 0.01 wt % to about 20 wt %, based on the combined weight of the unsaturated compound and the free radical precursor.

26. The binder composition, method, or composite product according to any one of paragraphs 1, 3-7, and 10-19, and 21, wherein the free radical precursor comprises one or more catalysts, wherein the one or more catalysts comprises one or more transition metal atoms, and wherein the one or more transition metal atoms is each bound to a corresponding complexing agent.

27. The binder composition, method, or composite product according to paragraph 26, wherein the one or more transition metal atoms is iron, copper, manganese, tungsten, molybdenum, cobalt, titanium, or any mixture thereof.

28. The binder composition, method, or composite product according to any one of paragraphs 1, 3-7, and 10-19, and 21, wherein the free radical precursor comprises one or more catalysts, wherein the one or more catalysts comprises one or more metal ions of iron, copper, manganese, tungsten, molybdenum, or any mixture thereof; or a combination thereof.

29. The binder composition, method, or composite product according to any one of paragraphs 1, 3-7, and 10-19, and 21, wherein the free radical precursor comprises one or more catalysts, and wherein the one or more catalysts comprises one or more transition metals with coordinated Lewis bases.

30. The binder composition, method, or composite product according to any one of paragraphs 1, 3-7, and 10-19, and 21, wherein the free radical precursor comprises one or more catalysts, and wherein the one or more catalysts is potassium ferricyanide, iron ethylenediaminetetraacetic acid, iron (S,S)-ethylenediamine-N,N'-disuccinic acid, iron diethylenetriamine pentaacetic acid, iron ethyleneglycol bis(2-aminoethylether)-N,N,N',N'-tetraacetic acid, iron trans-1,2-diaminocyclohexanetetraacetic acid, or any mixture thereof.

31. The binder composition, method, or composite product according to any one of paragraphs 1, 3-7, and 10-19, and 21, wherein the one or more free-radical precursors comprises one or more inorganic peroxy compounds, one or more organic peroxy compounds, or a mixture thereof.

32. The binder composition, method, or composite product according to any one of paragraphs 25-30, wherein the one or more catalysts is present in an amount of about 0.02 wt % to about 15 wt %, based on the combined weight of the unsaturated compound and the free-radical precursor.

33. The binder composition, method, or composite product according to any one of paragraphs 1, 3-7, and 10-19, and 21, wherein the one or more free-radical precursors is present in an amount of about 1 wt % to about 50 wt %, based on the combined weight of the unsaturated compound and the free-radical precursor.

34. The binder composition, method, or composite product according to any one of paragraphs 1, 3-7, and 10-19, and 21, wherein the free radical precursor comprise azobisisobutyronitrile.

35. The binder composition, method, or composite product according to any one of paragraphs 1 to 34, wherein the carbon-carbon bond capable of free radical addition is an $\alpha,\beta$-unsaturated carbonyl.

36. The binder composition, method, or composite product according to any one of paragraphs 1 to 35, wherein the unsaturated compound comprises dicyclopentadiene, ethylene glycol diacrylate, ethylene glycol dimethacrylate, diethylene glycol diacrylate, diethylene glycol dimethacrylate, poly(ethylene glycol)diacrylate, poly(ethylene glycol) dimethacrylate, trimethylolpropane triacrylate, pentaerythritol tetraacrylate, pentaerythritol triacrylate, polyacrylate starch, linseed oil, an unsaturated prepolymer, or any mixture thereof.

37. The binder composition, method, or composite product according to paragraph 36, wherein the unsaturated prepolymer is present and comprises an unsaturated polyester prepolymer, an unsaturated polyether prepolymer; an unsaturated polyamide prepolymer, an unsaturated polyurethane prepolymer, or any mixture thereof.

38. The binder composition, method, or composite product according to paragraph 37, wherein the unsaturated polyester prepolymer is present.

39. The binder composition, method, or composite product according to paragraph 37, wherein the unsaturated polyether prepolymer is present.

40. The binder composition, method, or composite product according to paragraph 37, wherein the unsaturated polyamide prepolymer is present.

41. The binder composition, method, or composite product according to paragraph 37, wherein the one or more unsaturated polyurethane prepolymers is present.

42. The binder composition, method, or composite product according to paragraph 37, wherein the unsaturated prepolymer is water soluble, water dispersible, or water emulsifiable.

43. The binder composition, method, or composite product according to paragraph 37, wherein the unsaturated prepolymer has a double bond equivalent molecular weight of about 33 to about 250,000.

44. The binder composition, method, or composite product according to any one of paragraphs 1-3, 5, 7, 11, 12, 20, and 21, wherein the binder composition has a viscosity of about 20 cP to about 300,000 cP at a temperature of 25° C.

45. The binder composition, method, or composite product according to any one of paragraphs 1-3, 5, 7, 11, 12, 20, and 21, wherein the binder composition has a pH of about 0.5 to about 8.5.

46. The binder composition, method, or composite product according to any one of paragraphs 1, 3-6, and 9-18, wherein the unsaturated compound is present in an amount of about 50 wt % to about 99 wt %, based on the combined weight of the unsaturated compound and the free-radical precursor.

47. The binder composition, method, or composite product according to any one of paragraphs 2, 8, 9, and 20, wherein the unsaturated compound is present in an amount of about 50 wt % to about 99 wt %, based on the combined weight of the unsaturated compound, catalyst, and the oxidant.

48. The binder composition, method, or composite product according to any one of paragraphs 1 to 47, wherein the unsaturated prepolymer has a viscosity of about 20 cP to about 50,000 cP at a temperature of 25° C.

49. The method according to any one of paragraphs 4, 6, and 8-10, further comprising pressing the mixture to a pressure greater than atmospheric pressure when the mixture is heated.

50. The method according to any one of paragraphs 4, 6, and 8-10, further comprising pressing the mixture to a pressure of about 0.1 MPa to about 10 MPa when the mixture is heated.

51. The method or composite product according to any one of paragraphs 4 to 50, wherein the composite product has an internal bond strength of at least 0.35 MPa to about 5 MPa.

52. The method or composite product according to any one of paragraphs 4 to 50, wherein the composite product has a density of about 0.5 $g/cm^3$ to about 1.0 $g/cm^3$.

53. The method or composite product according to any one of paragraphs 4 to 50, wherein the composite product has an internal bond strength of at least 0.35 MPa to about 5 MPa and a density of about 0.5 $g/cm^3$ to about 1.0 $g/cm^3$.

54. The method or composite product according to any one of paragraphs 4 to 53, wherein the composite product comprises a particleboard, a fiberboard, a plywood, an oriented strand board, a laminated veneer lumber, parallel strand lumber, or a laminated veneer board.

55. The binder composition, method, or composite product according to any one of paragraphs 1-7, 9-19, or 21-54, wherein the free radical precursor is present in an amount of about 7 wt %, about 10 wt %, about 12 wt %, about 15 wt %, about 20 wt %, about 25 wt %, about 30 wt %, about 35 wt %, about 40 wt %, bout 45 wt %, or about 50 wt % to about 75 wt %, about 80 wt %, about 85 wt %, about 90 wt %, about 95 wt %, or about 99 wt %, based on the combined weight of the one or more unsaturated compounds and the free radical precursor.

56. The binder composition, method, or composite product according to any one of paragraphs 1-7, 9-19, or 21-54, wherein the free radical precursor is present in an amount of about 7 wt %, about 10 wt %, about 12 wt %, about 15 wt %, about 20 wt %, about 25 wt %, about 30 wt %, about 35 wt %, about 40 wt %, bout 45 wt %, or about 50 wt % to about 75 wt %, about 80 wt %, about 85 wt %, about 90 wt %, about 95 wt %, or about 99 wt %, based on the weight of the one or more unsaturated compounds.

57. The binder composition, method, or composite product according to any one of paragraphs 1 to 56, wherein the unsaturated compound comprises the unsaturated prepolymer, and wherein the unsaturated prepolymer comprises a reaction product of maleic acid and a polyol, a reaction product of fumaric acid and a polyol, or a mixture thereof.

58. A binder composition, comprising: at least one unsaturated compound having two or more unsaturated carbon-carbon bonds, wherein at least one of the unsaturated carbon-carbon bonds is a pi-bond that is not conjugated with an aromatic moiety and is capable of free radical addition; and at least one free radical precursor, wherein the free radical precursor is present in an amount of about 7 wt % to about 99 wt %, based on the combined weight of the unsaturated compounds and the free radical precursor.

59. A binder composition, comprising: at least one unsaturated compound and at least one free radical precursor, wherein the free radical precursor is present in an amount of about 7 wt % to about 99 wt %, based on the weight of the unsaturated compound, and wherein the unsaturated compound comprises one or more vinyl aromatics, one or more methylstyrenes, or any mixture thereof.

60. A binder composition, comprising: at least one unsaturated compound and at least one free radical precursor, wherein the free radical precursor is present in an amount of about 7 wt % to about 99 wt %, based on the combined weight of the unsaturated compound and the free radical precursor, and wherein the unsaturated compound comprises one or more vinyl aromatics, one or more methylstyrenes, or any mixture thereof.

61. The binder composition according to any one of paragraphs 58 to 60, wherein the free radical precursor comprises a mixture of one or more inorganic oxidants and one or more catalysts.

62. The binder composition according to any one of paragraphs 58 to 60, wherein the free radical precursor comprises a mixture of hydrogen peroxide and one or more iron containing catalysts.

63. The binder composition according to any one of paragraphs 58 to 62, wherein the free radical precursor is present in an amount of at least 30 wt % to about 99 wt %, based on the weight of the one or more unsaturated compounds.

64. The binder composition according to any one of paragraphs 58 to 60, wherein the free radical precursor comprises a mixture of hydrogen peroxide and one or more catalysts, wherein the hydrogen peroxide is present in an amount of about 10 wt % to about 80 wt %, based on the combined weight of the unsaturated compound and the free radical precursor, and wherein the one or more catalysts is present in an amount of about 0.01 wt % to about 20 wt %, based on the combined weight of the unsaturated compound and the free radical precursor.

65. The binder composition according to any one of paragraphs 58 to 60, wherein the free radical precursor comprises one or more catalysts, wherein the one or more catalysts comprises one or more transition metal atoms, and wherein the one or more transition metal atoms is each bound to a corresponding complexing agent.

66. The binder composition according to paragraphs 65, wherein the one or more transition metal atoms is iron, copper, manganese, tungsten, molybdenum, cobalt, titanium, or any mixture thereof.

67. The binder composition according to any one of paragraphs 58 to 60, wherein the free radical precursor comprises one or more catalysts, wherein the one or more catalysts comprises one or more metal ions of iron, copper, manganese, tungsten, molybdenum, or any mixture thereof; or a combination thereof.

68. The binder composition according to any one of paragraphs 58 to 60, wherein the free radical precursor comprises one or more catalysts, and wherein the one or more catalysts comprises one or more transition metals with coordinated Lewis bases.

69. The binder composition according to any one of paragraphs 58 to 60, wherein the free radical precursor comprises one or more catalysts, and wherein the one or more catalysts is potassium ferricyanide, iron ethylenediaminetetraacetic acid, iron (S,S)-ethylenediamine-N,N'-disuccinic acid, iron diethylenetriamine pentaacetic acid, iron ethyleneglycol bis (2-aminoethylether)-N,N,N',N'-tetraacetic acid, iron trans-1,2-diaminocyclohexanetetraacetic acid, or any mixture thereof.

70. The binder composition according to any one of paragraphs 58 to 60, wherein the free radical precursor comprise azobisisobutyronitrile.

71. The binder composition according to any one of paragraphs 58 to 60, wherein the carbon-carbon bond capable of free radical addition is an α,β-unsaturated carbonyl.

72. The binder composition according to any one of paragraphs 58 to 71, wherein the unsaturated compound comprises dicyclopentadiene, ethylene glycol diacrylate, ethylene glycol dimethacrylate, diethylene glycol diacrylate, diethylene glycol dimethacrylate, poly(ethylene glycol)diacrylate, poly(ethylene glycol)dimethacrylate, trimethylolpropane triacrylate, pentaerythritol tetraacrylate, pentaerythritol triacrylate, polyacrylate starch, linseed oil, an unsaturated prepolymer, or any mixture thereof.

73. The binder composition according to paragraphs 72, wherein the unsaturated prepolymer is present and comprises an unsaturated polyester prepolymer, an unsaturated polyether prepolymer; an unsaturated polyamide prepolymer, an unsaturated polyurethane prepolymer, or any mixture thereof.

74. The binder composition according to any one of paragraphs 58 to 60, wherein the unsaturated compound is present in an amount of about 50 wt % to about 99 wt %, based on the combined weight of the unsaturated compound and the free-radical precursor.

75. The binder composition according to any one of paragraphs 58 to 60, wherein the free radical precursor is present in an amount of about 7 wt %, about 10 wt %, about 12 wt %, about 15 wt %, about 20 wt %, about 25 wt %, about 30 wt %, about 35 wt %, about 40 wt %, bout 45 wt %, or about 50 wt % to about 75 wt %, about 80 wt %, about 85 wt %, about 90 wt %, about 95 wt %, or about 99 wt %, based on the combined weight of the one or more unsaturated compounds and the free radical precursor.

76. The binder composition according to any one of paragraphs 58 to 60, wherein the free radical precursor is present in an amount of about 7 wt %, about 10 wt %, about 12 wt %, about 15 wt %, about 20 wt %, about 25 wt %, about 30 wt %, about 35 wt %, about 40 wt %, bout 45 wt %, or about 50 wt % to about 75 wt %, about 80 wt %, about 85 wt %, about 90 wt %, about 95 wt %, or about 99 wt %, based on the weight of the one or more unsaturated compounds.

77. The binder composition according to any one of paragraphs 58 to 60, wherein the unsaturated compound comprises an unsaturated prepolymer, and wherein the unsaturated prepolymer comprises a reaction product of maleic acid and a polyol, a reaction product of fumaric acid and a polyol, or a mixture thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a composite product, comprising:
combining a plurality of lignocellulose substrates, at least one unsaturated compound, and at least one free radical precursor to produce a mixture, wherein the unsaturated compound has two or more unsaturated carbon-carbon bonds, wherein at least one of the unsaturated carbon-carbon bonds is a pi-bond that is not conjugated with an aromatic moiety and is capable of free radical addition, and wherein the unsaturated compound comprises an unsaturated polyester prepolymer, an unsaturated polyether prepolymer, an unsaturated polyamide prepolymer, an unsaturated polyurethane prepolymer, or any mixture thereof; and
heating the mixture to a temperature of about 60° C. to about 300° C. to produce a composite product.

2. The method of claim 1, wherein the free radical precursor comprises a mixture of one or more inorganic oxidants and one or more catalysts.

3. The method of claim 1, wherein the free radical precursor comprises a mixture of hydrogen peroxide and one or more iron containing catalysts.

4. The method of claim 1, wherein the free radical precursor is present in an amount of at least 30 wt % to about 99 wt %, based on the weight of the one or more unsaturated compounds.

5. The method of claim 1, further comprising maintaining the mixture at a temperature less than 60° C. for at least 10 minutes prior to heating the mixture to the temperature of about 60° C. to about 300° C. to produce the composite product.

6. The method of claim 5, wherein at least 11 wt % of the one or more free radical precursors is present when the mixture is heated to at least 60° C.

7. The method of claim 3, wherein the iron containing catalyst comprises potassium ferricyanide, iron sulfate, iron ethylenediamine tetraacetic acid, iron (S,S)-ethylenediamine-N,N'-disuccinic acid, iron diethylenetriamine pentaacetic acid, iron ethyleneglycol bis(2-aminoethylether)-N,N,N',N'-tetraacetic acid, iron trans-1,2-diaminocyclohexanetetraacetic acid, or any mixture thereof.

8. The method of claim 7, wherein the iron containing catalyst comprises iron (S,S)-ethylenediamine-N,N'-disuccinic acid, iron diethylenetriamine pentaacetic acid, iron ethyleneglycol bis(2-aminoethylether)-N,N,N',N'-tetraacetic acid, iron trans-1,2-diaminocyclohexanetetraacetic acid, or any mixture thereof.

9. A method for making a composite product, comprising:
combining a plurality of lignocellulose substrates, at least one unsaturated compound, and at least one free radical precursor to produce a mixture; and
heating the mixture to a temperature of about 60° C. to about 300° C. to produce a composite product, wherein:
the unsaturated compound has two or more unsaturated carbon-carbon bonds, at least one of the unsaturated carbon-carbon bonds is a pi-bond that is not conjugated with an aromatic moiety and is capable of free radical addition, and the unsaturated compound comprises dicyclopentadiene, ethylene glycol diacrylate, ethylene glycol dimethacrylate, diethylene glycol diacrylate, diethylene glycol dimethacrylate, poly(ethylene glycol)diacrylate, poly(ethylene glycol)dimethacrylate, trimethylolpropane triacrylate, pentaerythritol tetraacrylate, pentaerythritol triacrylate, polyacrylate starch, or any mixture thereof.

10. The method of claim 9, wherein the free radical precursor comprises a mixture of hydrogen peroxide and one or more iron containing catalysts.

11. The method of claim 10, wherein the iron containing catalyst comprises potassium ferricyanide, iron sulfate, iron ethylenediamine tetraacetic acid, iron (S,S)-ethylenediamine-N,N'-disuccinic acid, iron diethylenetriamine pentaacetic acid, iron ethyleneglycol bis(2-aminoethylether)-N,N,N',N'-tetraacetic acid, iron trans-1,2-diaminocyclohexanetetraacetic acid, or any mixture thereof.

12. The method of claim 10, wherein the iron containing catalyst comprises iron (S,S)-ethylenediamine-N,N'-disuccinic acid, iron diethylenetriamine pentaacetic acid, iron ethyleneglycol bis(2-aminoethylether)-N,N,N',N'-tetraacetic acid, iron trans-1,2-diaminocyclohexanetetraacetic acid, or any mixture thereof.

13. The method of claim 9, wherein the free radical precursor is present in an amount of at least 30 wt % to about 99 wt %, based on the weight of the one or more unsaturated compounds.

14. The method of claim 9, further comprising maintaining the mixture at a temperature less than 60° C. for at least 10 minutes prior to heating the mixture to the temperature of about 60° C. to about 300° C. to produce the composite product.

15. The method of claim 14, wherein at least 11 wt % of the one or more free radical precursors is present when the mixture is heated to at least 60° C.

16. A method for making a composite product, comprising:
combining a plurality of lignocellulose substrates, at least one unsaturated compound, and at least one free radical precursor to produce a mixture; and
heating the mixture to produce a composite product, wherein:
the unsaturated compound has two or more unsaturated carbon-carbon bonds,
at least one of the unsaturated carbon-carbon bonds is a pi-bond that is not conjugated with an aromatic moiety and is capable of free radical addition,
the unsaturated compound comprises dicyclopentadiene, ethylene glycol diacrylate, ethylene glycol dimethacrylate, diethylene glycol diacrylate, diethylene glycol dimethacrylate, poly(ethylene glycol)diacrylate, poly(ethylene glycol)dimethacrylate, trimethylolpropane triacrylate, pentaerythritol tetraacrylate, pentaerythritol triacrylate, polyacrylate starch, an unsaturated polyester prepolymer, an unsaturated polyether prepolymer, an unsaturated polyamide prepolymer, an unsaturated polyurethane prepolymer, or any mixture thereof,
the free radical precursor comprises a mixture of hydrogen peroxide and one or more iron containing catalysts, and
the iron containing catalyst comprises potassium ferricyanide, iron sulfate, iron ethylenediamine tetraacetic acid, iron (S,S)-ethylenediamine-N,N'-disuccinic acid, iron diethylenetriamine pentaacetic acid, iron ethyleneglycol bis(2-aminoethylether)-N,N,N',N'-tetraacetic acid, iron trans-1,2-diaminocyclohexanetetraacetic acid, or any mixture thereof.

17. The method of claim 16, wherein:
the unsaturated compound comprises ethylene glycol diacrylate, ethylene glycol dimethacrylate, diethylene glycol diacrylate, diethylene glycol dimethacrylate, poly(ethylene glycol)diacrylate, poly(ethylene glycol)dimethacrylate, trimethylolpropane triacrylate, pentaerythritol tetraacrylate, pentaerythritol triacrylate, or any mixture thereof, and
the iron containing catalyst comprises iron (S,S)-ethylenediamine-N,N'-disuccinic acid, iron diethylenetriamine pentaacetic acid, iron ethyleneglycol bis(2-aminoethylether)-N,N,N',N'-tetraacetic acid, iron trans-1,2-diaminocyclohexanetetraacetic acid, or any mixture thereof.

18. The method of claim 16, wherein the free radical precursor is present in an amount of at least 30 wt % to about 99 wt %, based on the weight of the one or more unsaturated compounds.

19. The method of claim 16, wherein:
the mixture is heated to a temperature of about 60° C. to about 300° C. to produce the composite product, and
the mixture is maintained at a temperature less than 60° C. for at least 10 minutes prior to heating the mixture to the temperature of about 60° C. to about 300° C. to produce the composite product.

20. The method of claim 19, wherein at least 25 wt % of the one or more free radical precursors is present when the mixture is heated to at least 60° C.

* * * * *